United States Patent
Fox

(10) Patent No.: US 6,581,948 B2
(45) Date of Patent: Jun. 24, 2003

(54) INERTIA VALVE SHOCK ABSORBER

(75) Inventor: Robert C. Fox, Los Gatos, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 10/043,079

(22) Filed: Jan. 9, 2002

(65) Prior Publication Data

US 2003/0075402 A1 Apr. 24, 2003

Related U.S. Application Data

(60) Provisional application No. 60/316,442, filed on Aug. 30, 2001, and provisional application No. 60/329,042, filed on Oct. 12, 2001.

(51) Int. Cl.$^7$ .............................. B62K 25/08; F16F 9/34
(52) U.S. Cl. ...................................... 280/276; 188/275
(58) Field of Search ................................ 188/275, 319; 280/276, 279, 283

(56) References Cited

U.S. PATENT DOCUMENTS

| | | | |
|---|---|---|---|
| 1,281,079 A | 10/1918 | Sears | |
| 2,329,803 A | 9/1943 | Whisler | |
| 2,774,448 A | 12/1956 | Hultin | |
| 3,114,705 A | 12/1963 | Pribonic et al. | |
| 3,319,741 A | 5/1967 | Hauck | |
| 3,338,347 A | 8/1967 | Avner | |
| 3,414,092 A | 12/1968 | Speckhart | |
| 3,989,261 A | 11/1976 | Kawaguchi | |
| 4,254,849 A | 3/1981 | Pohlenz | |
| 4,295,658 A | 10/1981 | Kashima | |
| 4,492,290 A | 1/1985 | Zavodny | |
| 4,917,222 A | 4/1990 | Bacardit | |
| 5,072,813 A | 12/1991 | Yoshioka et al. | |
| 5,201,388 A | 4/1993 | Malm | |
| 5,277,283 A | 1/1994 | Yamaoka et al. | |
| 5,285,875 A | 2/1994 | Munoz | |
| 5,332,068 A | 7/1994 | Richardson et al. | |
| 5,449,189 A | 9/1995 | Chen | |
| 5,462,140 A | 10/1995 | Cazort et al. | |
| 5,598,903 A | 2/1997 | Richardson | |
| 5,823,305 A | 10/1998 | Richardson et al. | |
| 5,954,167 A | 9/1999 | Richardson et al. | |
| 5,957,252 A | 9/1999 | Berthold | |
| 5,992,585 A | 11/1999 | Kazmirski et al. | |
| 5,996,746 A | 12/1999 | Turner et al. | |
| 6,026,939 A | 2/2000 | Girvin et al. | |
| 6,105,987 A | 8/2000 | Turner | |
| 6,119,830 A | 9/2000 | Richardson et al. | |
| 6,135,434 A | 10/2000 | Marking | |

FOREIGN PATENT DOCUMENTS

| | | |
|---|---|---|
| AU | 294846 | 9/1966 |
| DE | 3544474 | 6/1987 |
| EP | 0 313 708 | 10/1987 |
| FR | 1 125 267 | 10/1956 |
| GB | 2 096 270 A | 3/1982 |

OTHER PUBLICATIONS

Co–pending Patent Application: Serial No. 10/042,767 filed Jan. 9, 2002, entitled Inertia Valve Shock Absorber, in the name of Robert C. Fox and assigned to Fox Factory, Inc.
Copy of International Search Report; application No. PCT/US02/27299.

*Primary Examiner*—Chris Schwartz
(74) *Attorney, Agent, or Firm*—Knobbe, Martens, Olson & Bear, LLP

(57) ABSTRACT

A dampener including a valve movable between an open position and a closed position to selectively alter the compression damping rate of the shock absorber. The valve may include a self-centering feature which operates to keep the valve body centered about the valve shaft. The dampener may also include a timer feature, which retains the valve in an open position for a predetermined period of time after it is initially opened.

31 Claims, 23 Drawing Sheets

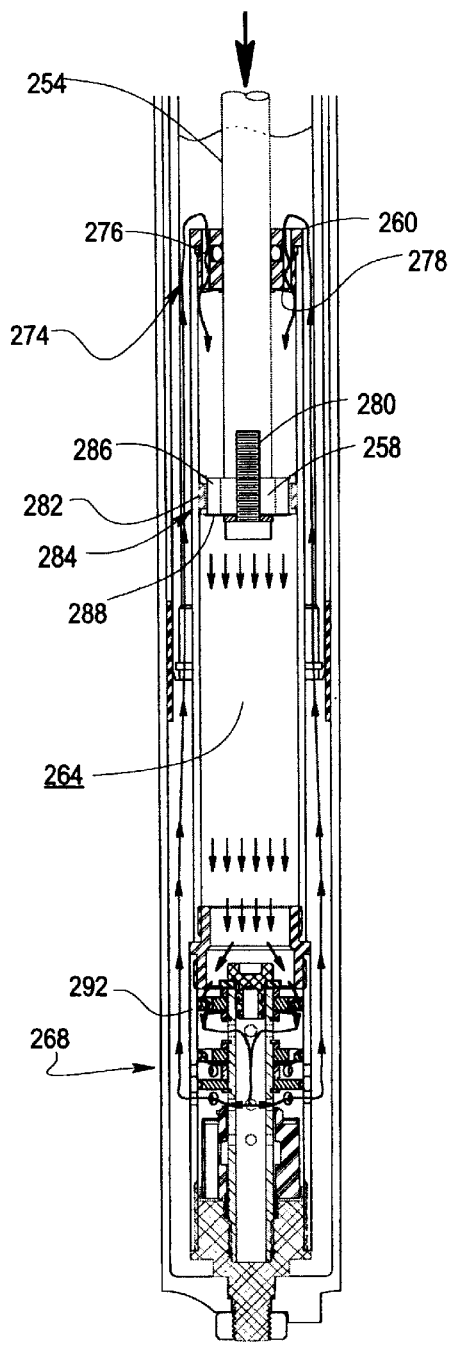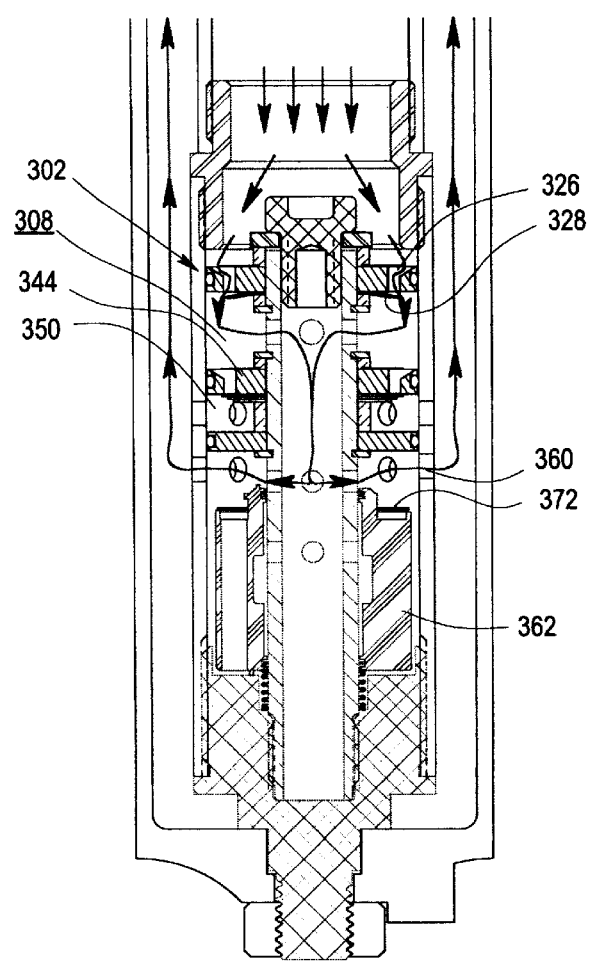
FIG. 18
FIG. 19

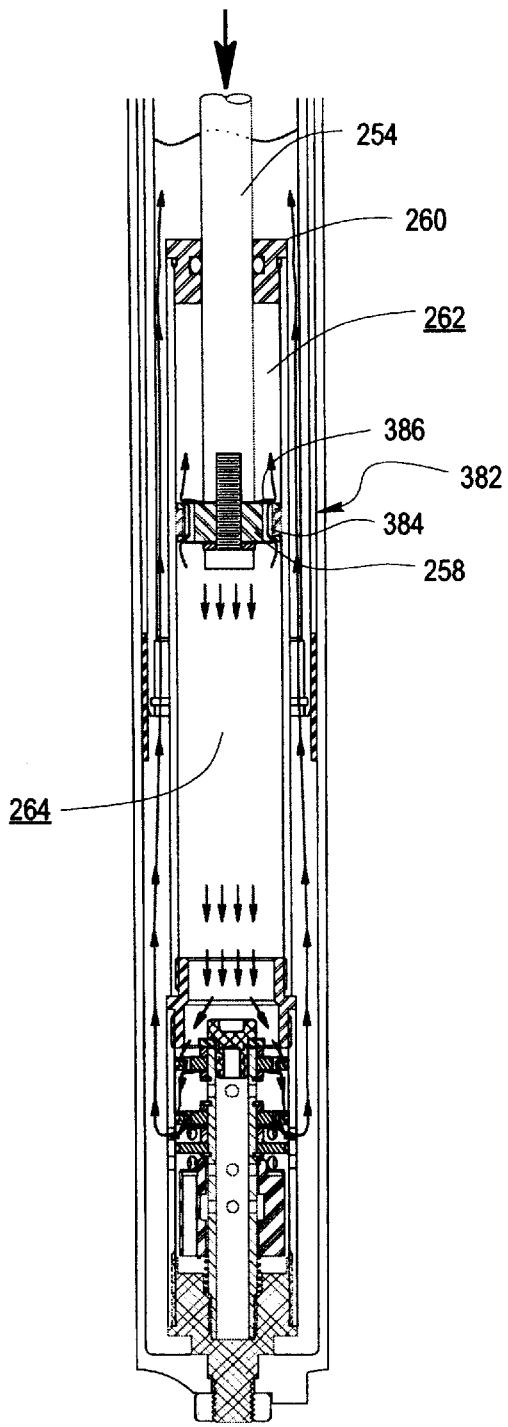
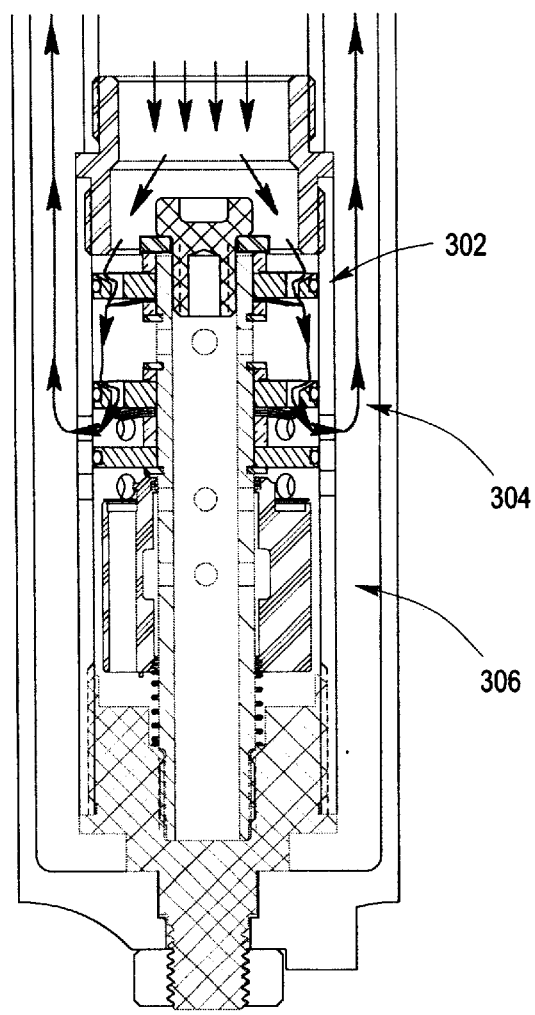
FIG. 22
FIG. 23

INERTIA VALVE SHOCK ABSORBER

PRIORITY INFORMATION

This application claims priority under 35 U.S.C. §119(e)(1) to U.S. Provisional Patent Application No. 60/316,442, filed Aug. 30, 2001, and U.S. Provisional Patent Application No. 60/329,042, filed Oct. 12, 2001, the entire specifications of which are incorporated by reference herein.

BACKGROUND OF THE INVENTION

1. Field of the Invention

The present invention relates to vehicle suspensions systems. More particularly, the present invention relates to acceleration sensitive damping arrangements suitable for use in vehicle dampeners (e.g., shock absorbers, struts, front forks).

2. Description of the Related Art

Inertia valves are utilized in vehicle shock absorbers in an attempt to sense instantaneous accelerations originating from a particular portion of the vehicle, or acting in a particular direction, and to alter the rate of damping accordingly. For example, the inertia valve may be configured to sense vertical accelerations originating at the sprung mass (e.g., the body of the vehicle) or at the unsprung mass (e.g., a wheel and associated linkage of the vehicle). Alternatively, the inertia valve may be configured to sense lateral accelerations of the vehicle.

Despite the apparent potential, and a long history of numerous attempts to utilize inertia valves in vehicle suspension, commercial inertia valve shock absorbers have enjoyed only limited success. Most attempted inertia valve shock absorbers have suffered from unresponsive or inconsistent operation due to undesired extraneous forces acting on the inertia valve. These extraneous forces may result from manufacturing limitations and/or external sources and often inhibit, or even prevent, operation of the inertia valve.

Further, there are currently no commercially available inertia valve shock absorbers for off-road bicycle, or mountain bike, applications. The problems associated with the use of inertia valves, mentioned above in relation to other vehicles, are magnified in the environment of lightweight vehicles and the relatively small size of mountain bike shock absorbers. Therefore, a need exists for an inertia valve shock absorber that can be commercially produced, and provides responsive, consistent performance without the problems associated with prior inertia valve designs.

SUMMARY OF THE INVENTION

A preferred embodiment is an acceleration-sensitive dampener including a first section at least partially defining a first chamber and a second section comprising a piston. The piston is movable within the first chamber. The dampener defines a second chamber and includes a first flow circuit connecting the first chamber and the second chamber. The dampener includes an inertia valve, comprising an inertia mass. The inertia mass is movable between a first position and a second position. In the first position, the valve substantially prevents fluid flow through the first flow circuit and in the second position, the valve permits fluid flow through the first circuit. The inertia mass moves between the first position and the second position in response to an acceleration force over a threshold. The acceleration force further causes the piston to move within the first chamber, the piston movement continuing until the piston completes a compression stroke. The inertia valve further comprises a body including a portion which cooperates to exert a force on the inertia mass which delays the inertia mass from returning to the first position until a period of time after completion of the compression stroke.

A preferred embodiment is an acceleration-sensitive dampener including a first section at least partially defining a first chamber and a second section comprising a piston. The piston is movable within the first chamber. The dampener defines a second chamber and includes a first flow circuit connecting the first chamber and the second chamber. The dampener also includes an inertia valve, comprising an inertia mass, and a stop defining a socket for receiving the inertia mass. The inertia mass is movable between a first position and a second position. When the inertia mass is in the first position, the valve is spaced from the stop. The valve is configured to substantially prevent fluid flow through the first circuit when the mass is in the first position. When the inertia mass is in the second position, the valve abuts the stop and is at least partially positioned within the socket. The valve is configured to permit fluid flow through the first flow circuit when the mass is in the second position. The inertia mass moves between the first position and the second position in response to an acceleration force over a threshold. The acceleration force further causes the piston to move within the first chamber, the piston movement continuing until the piston completes a compression stroke. The inertia valve further comprises a body including a portion which cooperates to exert a force on the inertia mass which delays the inertia mass from returning to the first position until a period of time after completion of the compression stroke.

A preferred embodiment is an acceleration-sensitive dampener including a first section at least partially defining a first chamber and a second section comprising a piston. The piston is movable within the first chamber. The dampener defines a second chamber and includes a first flow circuit connecting the first chamber and the second chamber. The dampener further includes an inertia valve comprising an inertia mass. The inertia mass is movable between a first position wherein the valve substantially prevents fluid flow through the first flow circuit and a second position which permits fluid flow through the first circuit. The inertia mass moves between the first position and the second position in response to an acceleration force over a threshold. The acceleration force further causes the piston to move within the first chamber, the piston movement continuing until the piston completes a compression stroke. The inertia valve further comprises a body including a portion which cooperates to exert a force on the inertia mass which delays the inertia mass from returning to the first position, wherein duration of such delay is independent of direction of movement of the piston.

A preferred embodiment is a method of dampening. The method includes providing an acceleration-sensitive dampener having a first section at least partially defining a first chamber and a second section comprising a piston. The piston is movable within the first chamber. The dampener also includes a second chamber. A first flow circuit connects the first chamber and the second chamber. The dampener further includes an inertia valve comprising an inertia mass. The inertia mass is movable between a first position wherein the valve substantially prevents fluid flow through the first flow circuit and a second position which permits fluid flow through the first circuit. The method additionally includes applying an acceleration force to the inertia valve to move the inertia mass from the first position to the second position and to move the piston within the first chamber. The movement of the piston continuing until the piston completes a compression stroke. The method further includes delaying the inertia mass from returning to the first position until after a period of time after completion of the compression stroke.

A preferred embodiment is a method of dampening including selecting an acceleration threshold at which lower dampening is desired. The method additionally includes selecting a time interval during which it is desirable to maintain the lower dampening and providing a dampener having an acceleration responsive valve movable between a closed position and an open position. In the closed position the dampener provides a greater level of dampening and in the open position the dampener provides a lower level of dampening. The method further includes moving the dampener from the closed position to the open position in response to an acceleration force over the acceleration threshold and, after the valve is moved from the closed position to the open position, delaying the valve from returning to the closed position before completion of a dampener compression stroke and before the time interval elapses.

A preferred embodiment is a shock absorber including a first portion. The shock absorber also includes a valve moveable between a first position removed from the first portion and a second position contacting the first portion. One of the first portion and the valve defines a first surface. The other of the first portion and the valve includes a plurality of projections which cooperate with the first surface to define a contact surface area between the first portion and the valve when the first portion and the valve are in the second position. Further, the ratio of the mass of the valve to the contact surface area is at least 17 pounds per square inch.

A preferred embodiment is an acceleration-sensitive dampener including a first section at least partially defining a first chamber and a second section comprising a piston. The piston is movable within the first chamber. The dampener defines a second chamber and includes a first flow circuit connecting the first chamber and the second chamber. The dampener further includes an inertia valve, comprising an inertia mass movable between a first position wherein the valve substantially prevents fluid flow through the first flow circuit and a second position which permits fluid flow through the first circuit. The inertia mass moves between the first position and the second position in response to an acceleration force over a threshold. The acceleration force further causes the piston to move within the first chamber. The piston movement continues until the piston completes a compression stroke. The inertia valve further comprises a means for delaying the inertia mass from returning to the first position until a period of time after completion of the compression stroke.

A preferred embodiment is an acceleration-sensitive dampener including a first section at least partially defining a first chamber and a second section comprising a piston movable within the first chamber. The dampener defines a second chamber and includes a first flow circuit connecting the first chamber and the second chamber. The dampener also includes an inertia valve, comprising an inertia mass and a stop defining a socket for receiving the inertia mass. The inertia mass is movable between a first position and a second position, wherein in the first position, the valve is spaced from the stop and is configured to substantially prevent fluid flow through the first circuit and in the second position, the valve abuts the stop and is at least partially positioned within the socket. The valve is configured to permit fluid flow through the first flow circuit when the mass is in the second position. The inertia mass moves between the first position and the second position in response to an acceleration force over a threshold. The acceleration force further causes the piston to move within the first chamber, the piston movement continuing until the piston completes a compression stroke. The dampener further includes a means for delaying the inertia mass from returning to the first position until a period of time after completion of the compression stroke.

A preferred embodiment is an acceleration-sensitive dampener including a first section at least partially defining a first chamber and a second section comprising a piston movable within the first chamber. The dampener defines a second chamber and includes a first flow circuit connecting the first chamber and the second chamber. The dampener also includes an inertia valve, comprising an inertia mass movable between a first position wherein the valve substantially prevents fluid flow through the first flow circuit and a second position which permits fluid flow through the first circuit. The inertia mass moves between the first position and the second position in response to an acceleration force over a threshold. The acceleration force further causes the piston to move within the first chamber, the piston movement continuing until the piston completes a compression stroke. The dampener further comprising means for delaying the inertia mass from returning to the first position, wherein duration of such delay is independent of direction of movement of the piston.

A preferred embodiment is an acceleration-sensitive dampener including a first section at least partially defining a first chamber and a second section comprising a piston. The piston is movable within the first chamber. The dampener defines a second chamber and includes a first flow circuit connecting the first chamber and the second chamber. The dampener includes an inertia valve, comprising an inertia mass movable between a first position wherein the valve substantially prevents fluid flow through the first flow circuit and a second position which permits fluid flow through the first circuit. The inertia valve moves between the first position and the second position in response to an acceleration force over a threshold. The acceleration force further causes the piston to move within the first chamber, the piston movement continuing until the piston completes a compression stroke. The inertia valve further includes a gripper which delays the inertia valve from returning to the first position until a period of time after both a last acceleration force over the threshold and completion of the compression stroke.

A preferred embodiment is a dampener including a first section and a second section. The first section at least partially defines a first chamber and the second section is movable with respect to the first section. A first flow circuit communicates with the first chamber. The dampener assembly also includes a first valve portion and a second valve portion. The first valve portion and second valve portion cooperate to define a first annular passage and a second annular passage. The first annular passage has a first portion defining a first cross-sectional flow area and a second portion defining a second cross-sectional flow area. The second cross-sectional flow area is greater than the first cross-sectional flow area. The second annular passage has a first portion defining a first cross-sectional flow area and a second portion defining a second cross-sectional flow area where the second cross-sectional flow area is greater than the first cross-sectional flow area. The first portion of the first and second annular passages are outward from the second portion. One of the first valve portion and the second valve portion defines an opening. The first valve portion and the second valve portion have a first position wherein the first portion of the first annular passage and the first portion of the second annular passage straddle the opening. The second portion of the first annular passage, the second portion of the second annular passage and the opening permit a first rate of flow through the opening. The first valve portion and the second valve portion also have a second position which permits a second rate of flow through the opening wherein the second rate of flow is greater than the first rate of flow.

A preferred embodiment is a dampener that includes a first section and a second section. The first section at least partially defines a first chamber. The second section is movable with respect to the first section. The dampener also includes a first flow circuit communicating with the first chamber. A first valve portion defines a first surface and a second valve portion defines a second surface, wherein the second surface faces the first surface. The second surface defines a first portion having a first section and a second section and a second portion having a first section and a second section. The first surface and the first section of the first portion of the second surface and the first surface and the first section of the second portion of the second surface define a first clearance distance when the first valve portion is centered with respect to the second valve portion. The first surface and the second section of the first portion of the second surface and the first surface and the second section of the second portion of the second surface defining a second clearance when the first valve portion is centered with respect to said second valve portion. Wherein further $¼ \leq$ (first clearance distance/second clearance distance)$<1$.

A preferred embodiment is a dampener as described in the paragraph above, wherein further $⅓ \leq$ (first clearance distance/second clearance distance)$<1$. A preferred embodiment is a dampener as described in the paragraph above, wherein further $⅖ \leq$ (first clearance distance/second clearance distance)$<1$. A preferred embodiment is a dampener as described in the paragraph above, wherein further $½ \leq$ (first clearance distance/second clearance distance)$<1$. A preferred embodiment is a dampener as described in the paragraph above, wherein (first clearance distance)$\leq 0.0125$ inches. A preferred embodiment is a dampener as described in the paragraph above, wherein (first clearance distance) $\leq 0.005$ inches. A preferred embodiment is a dampener as described in the paragraph above, wherein (first clearance distance)$\leq 0.003$ inches. A preferred embodiment is a dampener as described in the paragraph above, wherein (first clearance distance)$\leq 0.001$ inches. A preferred embodiment is a dampener as described in the paragraph above, wherein (second clearance distance−first clearance distance) $\geq 0.0001$ inches. A preferred embodiment is a dampener as described in the paragraph above, wherein (second clearance distance−first clearance distance)$\geq 0.001$ inches. A preferred embodiment is a dampener as described in the paragraph above, wherein (second clearance distance−first clearance distance)$\leq 0.05$ inches.

A preferred embodiment is a dampener assembly including a first section and a second section. The first section at least partially defines a first chamber. The second section includes a piston that is movable within the first chamber. The dampener assembly also includes a second chamber and a first flow circuit connecting the first chamber and the second chamber. An inertia valve is movable between a first position substantially preventing flow through the first flow circuit and a second position permitting flow through the first flow circuit. The inertia valve includes a first valve portion and a second valve portion. The first valve portion and the second valve portion cooperate to define a first annular passage and a second annular passage. The first annular passage has a first portion defining a first cross-sectional flow area and a second portion defining a second cross-sectional flow area. The second cross-sectional flow area of the first annular passage is greater than the first cross-sectional flow area of the first annular passage. The second annular passage also has a first portion defining a first cross-sectional flow area and a second portion defining a second cross-sectional flow area. The second cross-sectional flow area of the second annular passage is greater than the first cross-sectional flow area of the second annular passage. The first portions of the first annular passage and the second annular passage are outward from the second portions. One of the first valve portion and the second valve portion define an opening. The first valve portion and the second valve portion have a first position wherein the first portion of the first annular passage and the first portion of the second annular passage straddle the opening, wherein the second portion of the first annular passage, the second portion of the second annular passage and the opening permit a first rate of flow through the opening. The first valve portion and the second valve portion also have a second position which permits a second rate of flow through the opening wherein the second rate of flow is greater than the first rate of flow.

A preferred embodiment is a dampener assembly including a first section at least partially defining a chamber and a second section comprising a piston. The piston is movable within the chamber to create a compression fluid flow and a rebound fluid flow. The dampener assembly additionally includes an inertia valve movable along an axis, wherein no significant component of force is exerted on the inertia valve in a direction parallel to the axis due to either of the compression fluid flow and the rebound fluid flow.

A preferred embodiment is a bicycle dampener including a first section at least partially defining a first chamber and a second section movable with respect to the first section. A first flow circuit communicates with the first chamber. A first valve portion and a second valve portion cooperate to define a first annular passage and a second annular passage. The first annular passage has a first portion defining a first cross-sectional flow area and a second portion defining a second cross-sectional flow area greater than the first cross-sectional flow area. The second annular passage has a first portion defining a first cross-sectional flow area and a second portion defining a second cross-sectional flow area greater than the first cross-sectional flow area. The first portions of the first annular passage and the second annular passage are outward from the second portions and one of the first valve portion and the second valve portion defining an opening. The first valve portion and the second valve portion have a first position wherein the first portion of the first annular passage and the first portion of the second annular passage straddle the opening. In the first position, the second portion of the first annular passage, the second portion of the second annular passage and the opening permitting a first rate of flow through the opening. In a second position of the first valve portion and the second valve portion, a second rate of flow through the opening greater than the first rate of flow is permitted.

A preferred embodiment is a bicycle dampener that includes a first section and a second section. The first section at least partially defines a first chamber. The second section is movable with respect to the first section. The dampener also includes a first flow circuit communicating with the first chamber. A first valve portion defines a first surface and a second valve portion defines a second surface, wherein the second surface faces the first surface. The second surface defines a first portion having a first section and a second section and a second portion having a first section and a second section. The first surface and the first section of the first portion of the second surface and the first surface and the first section of the second portion of the second surface define a first clearance distance when the first valve portion is centered with respect to the second valve portion. The first surface and the second section of the first portion of the second surface and the first surface and the second section of the second portion of the second surface define a second clearance when the first valve portion is centered with respect to said second valve portion. Fluid flow through the first clearance distance defines a first fluid velocity and fluid flow through the second clearance distance defines a second fluid velocity, wherein (second fluid velocity/first fluid velocity) is between 0.9 and 0.2.

A preferred embodiment is an inertia valve assembly including a first section and a second section. The inertia valve assembly also includes a first valve portion defining a first surface and a second valve portion defining a second surface. The second surface faces the first surface. The first surface and the second surface are configured to cooperate to form a flow path having varying cross-sectional areas, sized and shaped to produce, in the presence of flow through the flow path and forces tending to push the first valve portion off center with respect to the second valve portion, forces which tend to center the first valve portion with respect to the second valve portion.

BRIEF DESCRIPTION OF THE DRAWINGS

These and other features of the dampener will now be described with reference to drawings of preferred embodiments. The embodiments are illustrated in the context of use on an off-road bicycle, however, these embodiments are merely intended to illustrate, rather than limit, the present invention. The drawings contain the following figures:

FIG. 4b is a side cross-section view of the inertia mass of FIG. 2 taken along line 4b—4b in FIG. 4a.

FIG. 18 is a cross-section view of the lower portion of the fork of FIG. 15, with the inertia valve in an open position;

FIG. 19 is the base valve assembly of FIG. 17, with the inertia valve in an open position;

FIG. 22 is a cross-section view of a lower portion of an alternative embodiment of a suspension fork;

FIG. 23 is an enlarged view of the base valve assembly of the fork of FIG. 22, with the inertia valve in a closed position;

DETAILED DESCRIPTION OF THE PREFERRED EMBODIMENT

Figure 1:
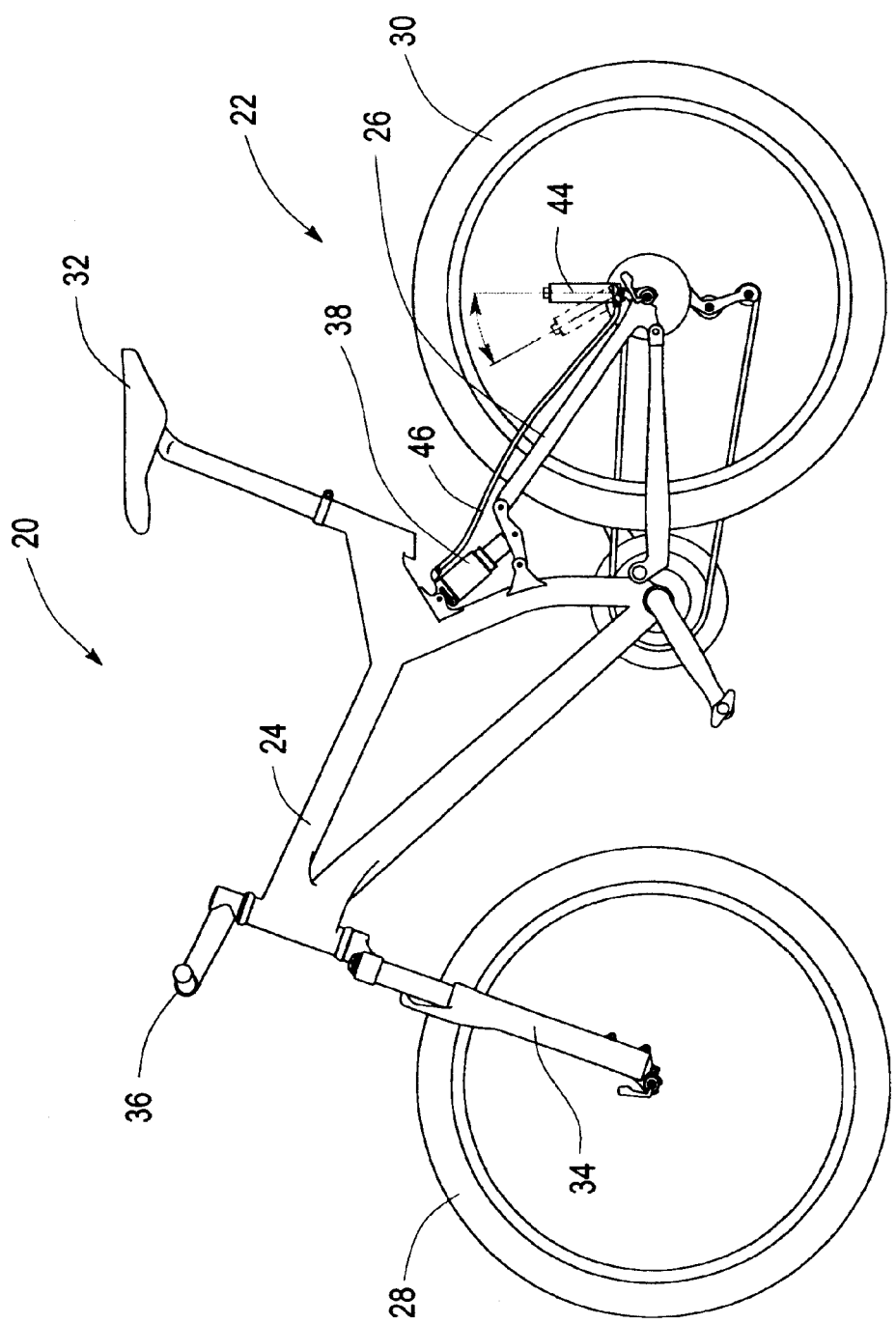
FIG. 1 is a perspective view of a bicycle including preferred front and rear shock absorbers.
Figure 2:
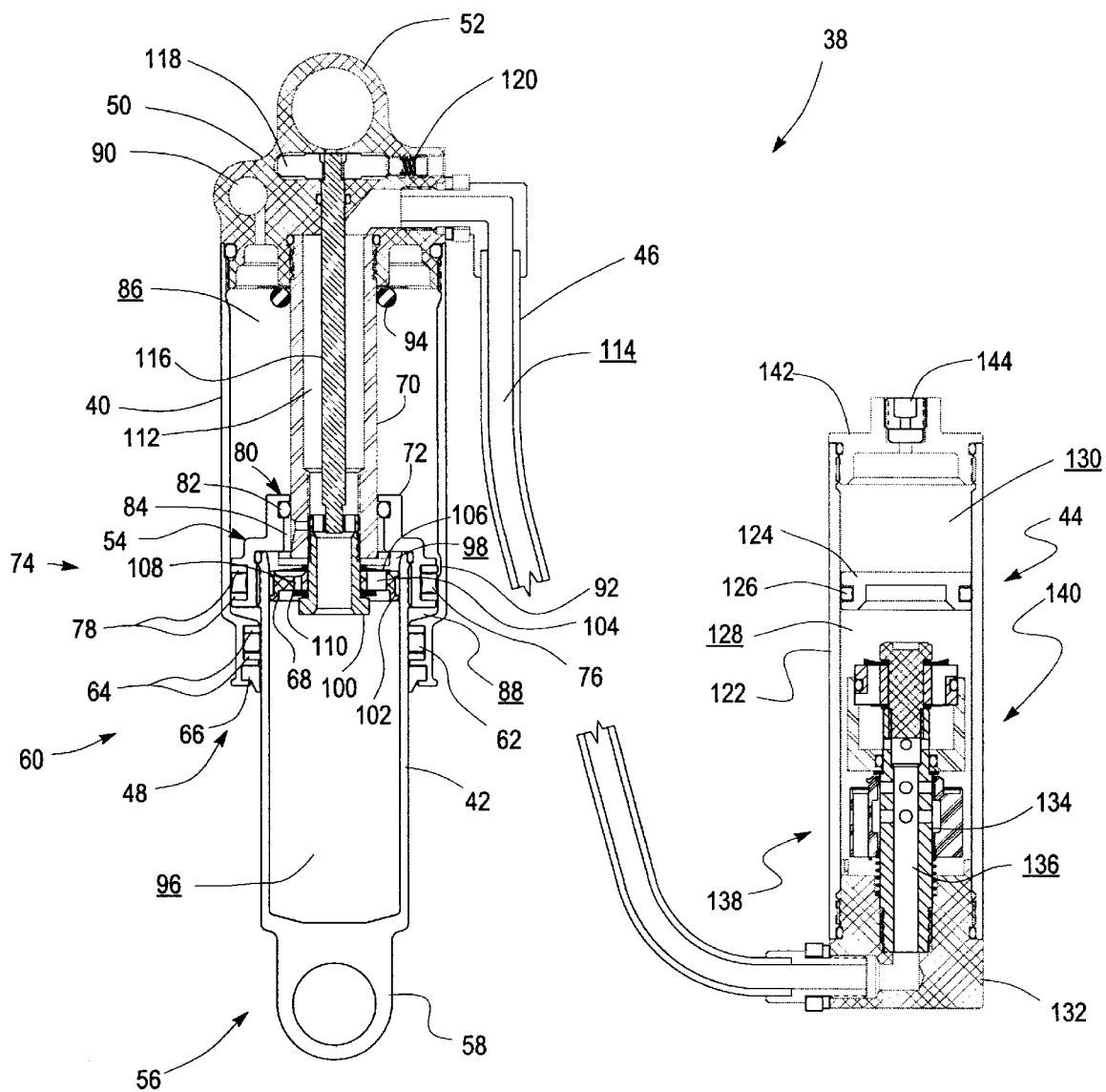
FIG. 2 is a cross-section of the rear shock absorber of FIG. 1.

FIG. 1 illustrates an off-road bicycle, or mountain bike, 20 including a frame 22 which is comprised of a main frame portion 24 and a swing arm portion 26. The swing arm portion 26 is pivotally attached to the main frame portion 24. The bicycle 20 includes front and rear wheels 28, 30 connected to the main frame 24. A seat 32 is connected to the main frame 24 and provides support for a rider of the bicycle 20.

The front wheel 28 is supported by a preferred embodiment of a suspension fork 34 which, in turn, is secured to the main frame 24 by a handlebar assembly 36. The rear wheel 30 is connected to the swing arm portion 26 of the frame 22. A preferred embodiment of a rear shock 38 is operably positioned between the swing arm 26 and the main frame 24 to provide resistance to the pivoting motion of the swing arm 26. Thus, the illustrated bicycle 20 includes suspension members 34, 38 between the front and rear wheels 28, 30 and the frame 22, which operate to substantially reduce wheel impact forces from being transmitted to the rider of the bicycle 20. The rear shock absorber 38 desirably includes a fluid reservoir 44 hydraulically connected to the main shock body by a hydraulic hose 46. Preferably, the reservoir 44 is connected to the swingarm portion 26 of the bicycle 20 above the hub axis of the rear wheel 30.

The suspension fork 34 and the rear shock 38 preferably include an acceleration-sensitive valve, commonly referred to as an inertia valve, which allows the damping rate to be varied depending upon the direction of an acceleration input. The inertia valve permits the suspension fork 34 and rear shock 38 to distinguish between accelerations originating at the sprung mass, or main frame 24 and rider of the bicycle 20, from accelerations originating at the unsprung mass, or front wheel 28 and rear wheel 30, and alter the damping rate accordingly. It is generally preferred to have a firm damping rate when accelerations originate at the sprung mass and a softer damping rate when the accelerations originate at the unsprung mass. On an automobile or other four-wheel vehicle, this helps to stabilize the body by reducing fore and aft pitching motions during acceleration and braking, as well as by reducing body roll during cornering.

In a similar manner, on two-wheel vehicles such as motorcycles and bicycles, vehicle stability is improved by reduction of fore and aft pitching motions. In addition, in the case of bicycles and other pedal-driven vehicles, this reduces or prevents suspension movement in response to rider-induced forces, such as pedaling forces, while allowing the suspension to absorb forces induced by the terrain on which the bicycle 20 is being ridden. As will be described in detail below, the inertia valving within the suspension fork 34 and rear shock 38 include features which permit responsive, consistent performance and allow such inertia valves to be manufactured in a cost effective manner. Preferably, the inertia valve is located within the reservoir 44, which may be rotated relative to the swingarm portion 26 of the bicycle 20. Rotating the reservoir 44 alters the component of an upward acceleration of the rear wheel 30 which acts along the axis of motion of the inertia valve and thereby influences the responsiveness of the inertia valve.

FIGS. 2–7 illustrate a preferred embodiment of the rear shock absorber 38. A shock absorber 38 operates as both a suspension spring and as a damper. Preferably, the spring is an air spring arrangement, but coil springs and other suitable arrangements may also be used. The shock 38 is primarily comprised of an air sleeve 40, a shock body 42 and a reservoir 44. In the illustrated embodiment, a hydraulic hose 46 physically connects the main body of the shock 38 (air sleeve 40 and shock body 42) to the reservoir 44. However, the reservoir 44 may also be directly connected to the main body of the shock absorber 38, such as being integrally connected to, or monolithically formed with, the air sleeve 40.

The air sleeve 40 is cylindrical in shape and includes an open end 48 and an end closed by a cap 50. The cap 50 of the air sleeve 40 defines an eyelet 52 which is used for connection to the main frame 24 of the bicycle 20 of FIG. 1. The open end 48 of the air sleeve 40 slidingly receives the shock body 42.

The shock body 42 is also cylindrical in shape and includes an open end 54 and a closed end 56. The closed end 56 defines an eyelet 58 for connecting the shock 38 to the swing arm portion 26 of the bicycle 20 of FIG. 1. Thus, the air sleeve 40 and the shock body 42 are configured for telescopic movement between the main frame portion 24 and the swing arm portion 26 of the bicycle 20. If desired, this arrangement may be reversed and the shock body 42 may be connected to the main frame 24 while the air sleeve 40 is connected to the swing arm 26.

A seal assembly 60 is positioned at the open end 48 of the air sleeve 40 to provide a substantially airtight seal between the air sleeve 40 and the shock body 42. The seal assembly 60 comprises a body seal 62 positioned between a pair of body bearings 64. The illustrated body seal 62 is an annular seal having a substantially square cross-section. However, other suitable types of seals may also be used. A wiper 66 is positioned adjacent the open end 48 of the air sleeve 40 to remove foreign material from the outer surface of the shock body 42 as it moves into the air sleeve 40.

A damper piston 68 is positioned in sliding engagement with the inner surface of the shock body 42. A shock shaft 70 connects the piston 68 to the cap 50 of the air sleeve 40. Thus, the damper piston 68 is fixed for motion with the air sleeve 40.

A piston cap 72 is fixed to the open end 54 of the shock body 42 and is in sliding engagement with both the shock shaft 70 and the inner surface of the air sleeve 40. The piston cap 72 supports a seal assembly 74 comprised of a seal member 76 positioned between a pair of bearings 78. The seal assembly 74 is in a sealed, sliding engagement with the inner surface of the air sleeve 40. A shaft seal arrangement 80 is positioned to create a seal between the cap 72 and the shock shaft 70. The shaft seal arrangement 80 comprises a seal member 82 and a bushing 84. The seal member 82 is an annular seal with a substantially square cross-section, similar to the body seal 62. The shaft seal arrangement 80 creates a substantially airtight seal between the cap 72 and the shock shaft 70 while allowing relative sliding motion therebetween.

A positive air chamber 86 is defined between the closed end 50 of the air sleeve 40 in the cap 72. Air held within the positive air chamber 86 exerts a biasing force to resist compression motion of the shock absorber 38. Compression motion of the shock absorber 38 occurs when the closed ends 56 and 50 of the shock body 42 and air sleeve 40 (and thus the eyelets 52, 58) move closer to one another.

A negative air chamber 88 is defined between the cap 72 and the seal assembly 60, which in combination with the shock body 42 closes the open end 48 of the air sleeve 40. Air trapped within the negative air chamber 88 exerts a force which resists expansion, or rebound, motion of the shock absorber 38. Rebound motion of the shock absorber 38 occurs when the closed ends 56 and 50 of the shock body 42 and air sleeve 40 (and thus the eyelets 52, 58) move farther apart from each other. Together, the positive air chamber 86 and the negative air chamber 88 function as the suspension spring portion of the shock absorber 38.

An air valve 90 communicates with the positive air chamber 86 to allow the air pressure therein to be adjusted. In this manner, the spring rate of the shock absorber 38 may be easily adjusted.

A bypass valve 92 is provided to allow the pressure between the positive air chamber 86 and the negative air chamber 88 to be equalized. The bypass valve 92 is configured to allow brief communication between the positive air chamber 86 and the negative air chamber 88 when the air sleeve seal assembly 74 passes thereby. A bottom out bumper 94 is positioned near the closed end 50 of the air sleeve 40 to prevent direct metal to metal contact between the closed end 50 and the cap 72 of the shock body 42 upon full compression of the shock absorber 38.

The shock absorber 38 also includes a damper assembly, which is arranged to provide a resistive force to both compression and rebound motion of the shock absorber 38. Preferably, the shock absorber 38 provides modal response compression damping. That is, the shock absorber 38 preferably operates at a first damping rate until an appropriate acceleration input is sensed, then the shock absorber 38 operates at a second damping rate for a predetermined period thereafter, before returning the first damping rate. This is in opposition to a system that attempts to continually respond to instantaneous input. Such a modal system avoids the inherent delay associated with responding separately to each input event.

The piston 68 divides the interior chamber of the shock body 42 into a compression chamber 96 and a rebound chamber 98. The compression chamber 96 is defined between the piston 68 and the closed end 56 of the shock body 42 and decreases in volume during compression motion of the shock absorber 38. The rebound chamber 98 is defined between the piston 68 and the piston cap 72, which is fixed to the open end 54 of the shock body 42. The rebound chamber 98 decreases in volume upon rebound motion of the shock absorber 38.

The piston 68 is fixed to the shock shaft 70 by a hollow threaded fastener 100. A seal 102 is fixed for movement with the piston 68 and creates a seal with the inner surface of the shock body 42. The illustrated seal 102 is of an annular type having a rectangular cross-section. However, other suitable types of seals may also be used.

The piston 68 includes one or more axial compression passages 104 that are covered on the rebound chamber 98 side by a shim stack 106. As is known, the shim stack 106 is made up of one or more flexible shims and deflects to allow flow through the compression passages 104 during compression motion of the shock absorber 38 but prevents flow through the compression passages 104 upon rebound motion of the shock absorber 38. Similarly, the piston 68 includes one or more rebound passages 108 extending axially therethrough. A rebound shim stack 110 is made up of one or more flexible shims, and deflects to allow flow through the rebound passages 108 upon rebound motion of the shock absorber 38 while preventing flow through the rebound passages 108 during compression motion of the shock absorber 38.

A central passage 112 of the shock shaft 70 communicates with the compression chamber 96 through the hollow fastener 100. The passage 112 also communicates with the interior chamber of the reservoir 44 through a passage 114 defined by the hydraulic hose 46. Thus, the flow of hydraulic fluid is selectively permitted between the compression chamber 96 and the reservoir 44.

A rebound adjustment rod 116 extends from the closed end 50 of the air sleeve 40 and is positioned concentrically within the passage 112 of the shock shaft 70. The rebound adjustment rod 116 is configured to alter the amount of fluid flow upon rebound motion thereby altering the damping force produced. An adjustment knob 118 engages the rebound adjustment rod 116 and is accessible externally of the shock absorber 38 to allow a user to adjust the rebound damping rate. A ball detent mechanism 120 operates in a known manner to provide distinct adjustment positions of the rebound damping rate.

The reservoir 44 includes a reservoir tube 122 closed on either end. A floating piston 124 is in sliding engagement with the interior surface of a reservoir tube 122. A seal member 126 provides a substantially fluid-tight seal between the piston 124 and the interior surface of the reservoir tube 122. The seal member 126 is preferably an annular seal having a substantially square cross-section. However, other suitable seals may also be used.

The floating piston 124 divides the interior chamber of the reservoir tube 122 into a reservoir chamber 128 and a gas chamber 130. The reservoir chamber 128 portion of the reservoir tube is closed by an end cap 132. The end cap 132 additionally receives the end of the hydraulic hose 46 and supports a hollow reservoir shaft 134. The central passage 136 of the reservoir shaft 134 is in fluid communication with the passages 114 and 112 and, ultimately, the compression chamber 96.

The reservoir shaft 134 supports an inertia valve assembly 138 and a blowoff valve assembly 140. Each of the inertia valve assembly 138 and the blowoff valve assembly 140 allows selective communication between the compression chamber 96, via the passages 112, 114, 136, and the reservoir chamber 128.

The gas chamber 130 end of the reservoir tube 122 is closed by a cap 142 which includes a valve assembly 144 for allowing gas, such as nitrogen, for example, to be added or removed from the gas chamber 130. The pressurized gas within the gas chamber 130 causes the floating piston 124 to exert a pressure on the hydraulic fluid within the reservoir chamber 128. This arrangement prevents air from being drawn into the hydraulic fluid and assists in refilling fluid into the compression chamber 96 during rebound motion of the shock absorber 38.

Figure 3A:
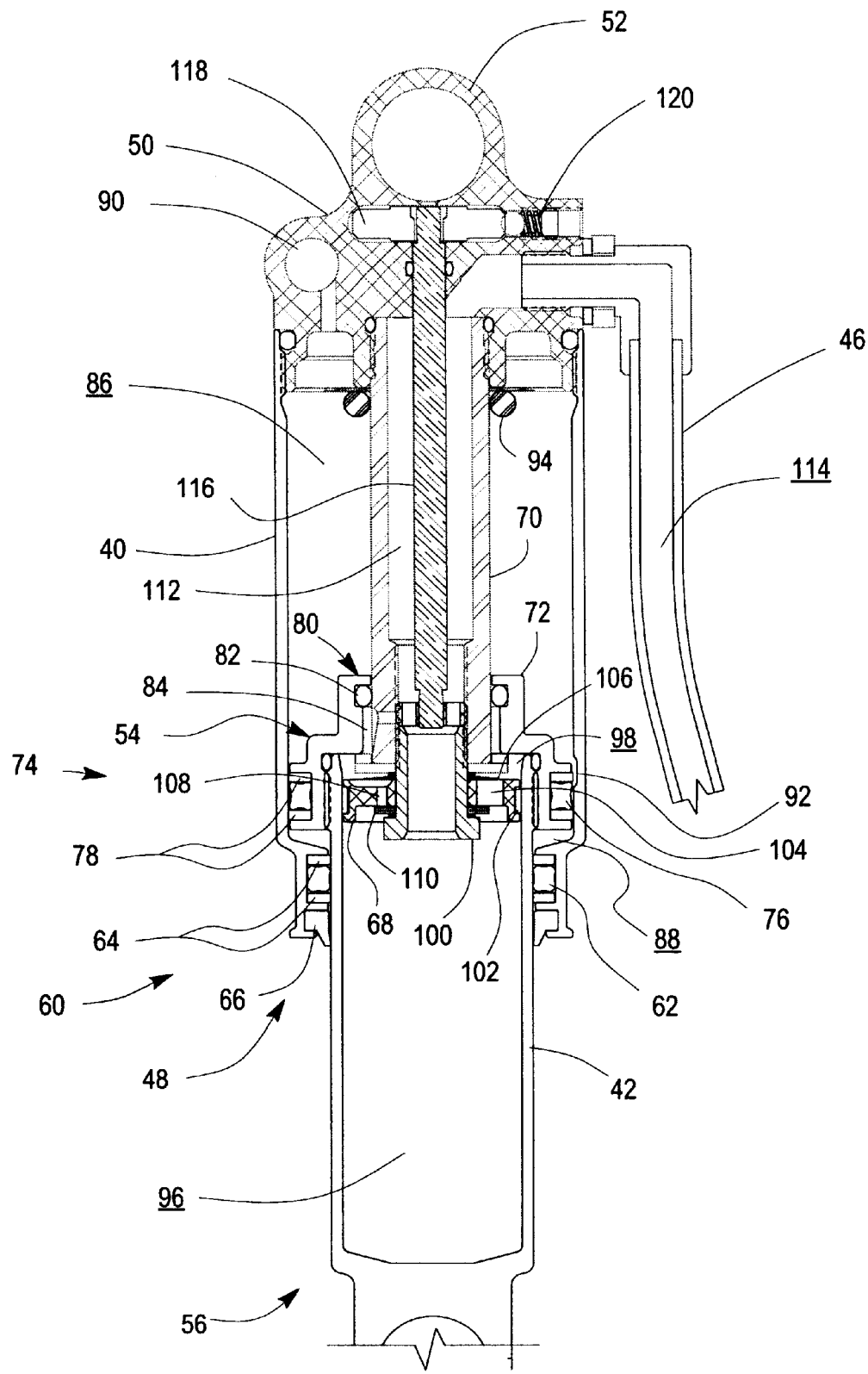
FIG. 3a is an enlarged cross-section of a main portion of the shock absorber of FIG. 2
Figure 3B:
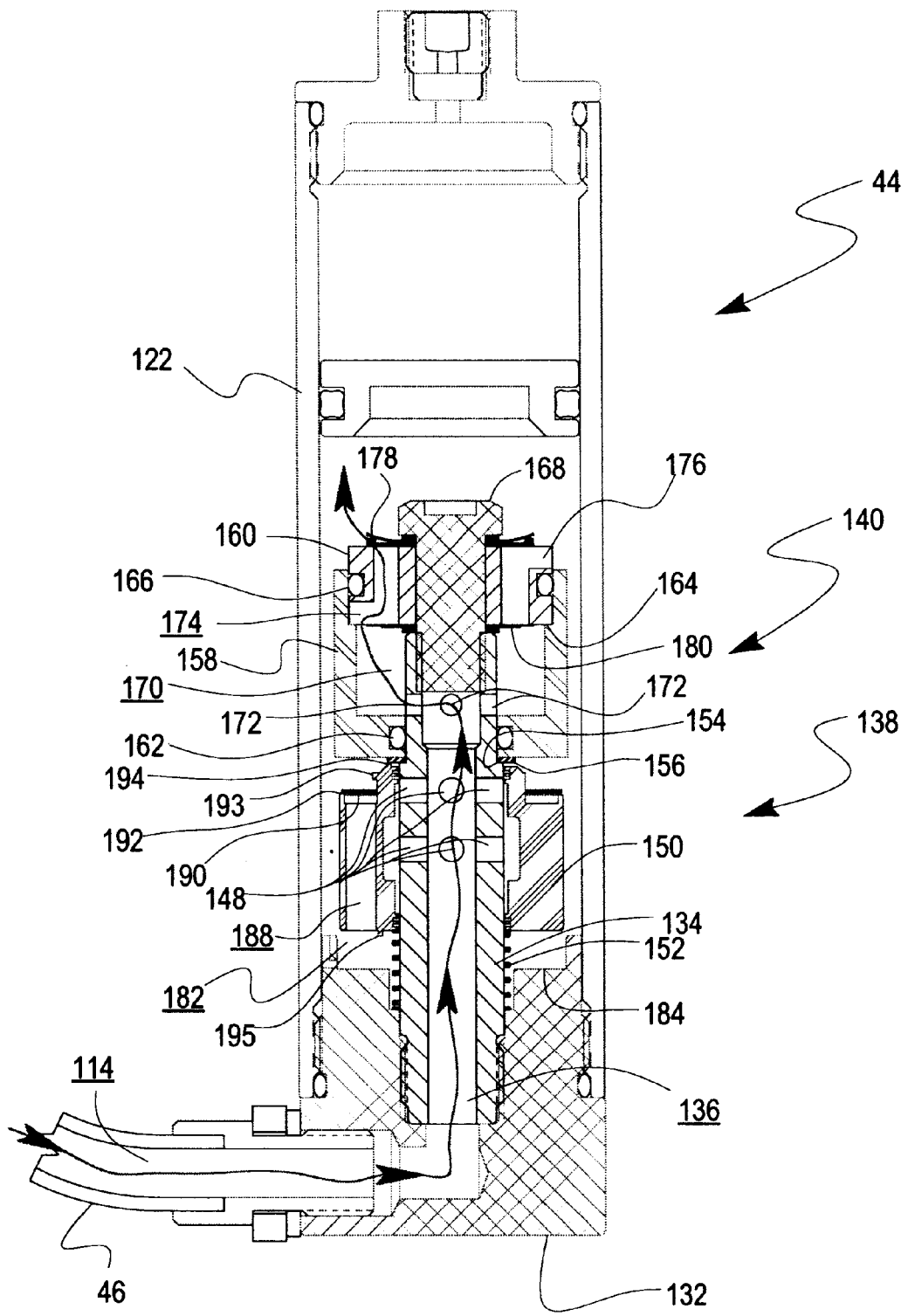
FIG. 3b is an enlarged cross-section of a reservoir of the shock absorber of FIG. 2 showing an inertia valve in a closed position.

With reference to FIG. 3b, the blowoff valve assembly 140 is supported by the reservoir shaft 134 and positioned above the inertia valve assembly 138. The reservoir shaft 134 reduces in diameter to define a shoulder portion 154. An annular washer 156 is supported by the shoulder 154 and the blowoff valve assembly 140 is supported by the washer 156. The washer 156 also prevents direct contact between the inertia mass 150 and the blowoff valve assembly 140.

The blowoff valve assembly 140 is primarily comprised of a cylindrical base 158 and the blowoff cap 160. The base 158 is sealed to the reservoir shaft 134 by a shaft seal 162. The illustrated seal 162 is an O-ring, however other suitable seals may also be used. The upper end of the base 158 is open and includes a counterbore which defines a shoulder 164. The blowoff cap 160 is supported by the shoulder 164 and is sealed to the inner surface of the base 158 by a cap seal 166. The cap seal 166 is preferably an O-ring, however other suitable seals may also be used. A threaded fastener 168 fixes the blowoff cap 160 and base 158 to the reservoir shaft 134.

The blowoff cap 160 and base 158 define a blowoff chamber 170 therebetween. A plurality of radial fluid flow passages 172 are defined by the reservoir shaft 134 to allow fluid communication between the blowoff chamber 170 and the shaft passage 136.

The blowoff cap 160 includes one or more axial blowoff passages 174 and one or more axial refill passages 176. A blowoff shim stack 178 is positioned above the blowoff cap 160 and covers the blowoff passages 174. The blowoff shim stack 178 is secured in place by the threaded fastener 168. The individual shims of the shim stack 178 are capable of deflecting about the central axis of the fastener 168 to selectively open the blowoff passages 174 and allow fluid communication between the blowoff chamber 170 and the reservoir chamber 128. The blowoff shim stack 178 is preferably configured to open in response to pressures within the blowoff chamber above a minimum threshold, such as approximately 800 psi, for example.

A refill shim stack 180 is positioned between the blowoff cap 160 and the reservoir shaft 134 and covers the refill ports 176. The refill shim stack 180 is configured to prevent fluid from flowing from the blowoff chamber 170 through ports 176 to the reservoir 128 while offering little resistance to flow from the reservoir 128 into the blowoff chamber 170.

The inertia valve assembly 138 includes a plurality of radially extending, generally cylindrical valve passages 148, connecting the passage 136 to the reservoir chamber 128. The inertia valve assembly 138 also includes a valve body, or inertia mass 150, and a spring 152. The spring 152 biases the inertia mass 150 into an upward, or closed, position wherein the inertia mass 150 covers the mouths of the valve passages 148 to substantially prevent fluid flow from the passage 136 to the reservoir chamber 128. The inertia mass 150 is also movable into a downward, or open, position against the biasing force of the spring 152. In the open position, the inertia mass 150 uncovers at least some of the valve passages 148 to allow fluid to flow therethrough.

Figure 5:
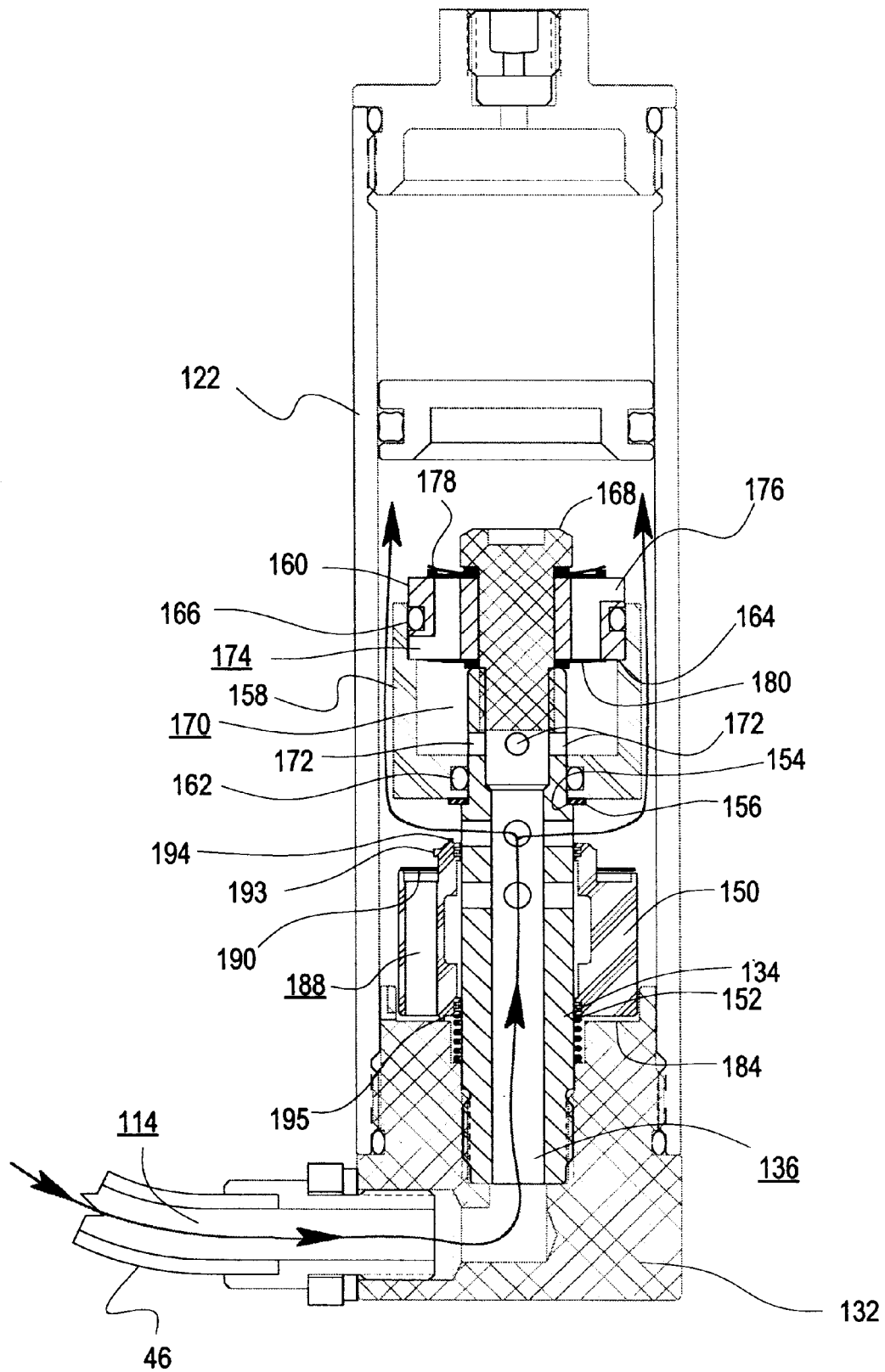
FIG. 5 is an enlarged cross-section of the reservoir of the shock absorber of FIG. 2, showing the inertia valve in an open position.

The end cap 132, which closes the lower end of the reservoir tube 122, defines a cylindrical pocket, or socket, 182 which receives the inertia mass 150 in its lowermost or open position. The lowermost portion of the pocket 182 reduces in diameter to form a shoulder 184. The shoulder 184 operates as the lowermost stop surface, which defines the open position of the inertia mass 150, as illustrated in FIG. 5.

The inertia mass 150 includes a check plate 190 which allows fluid to be quickly displaced from the pocket 182 as the inertia mass 150 moves downward into the pocket 182. The inertia mass 150 has a plurality of axial passages 188 extending therethrough. The check plate 190 rests on several projections, or standoff feet, 192 (FIG. 6) slightly above the upper surface of the inertia mass 150 and substantially covers the passages 188. A series of stop projections 193, similar to the standoff feet, are formed or installed in the upper, necked portion of the inertia mass 150 to limit upward motion of the check plate 190.

Figure 4A:
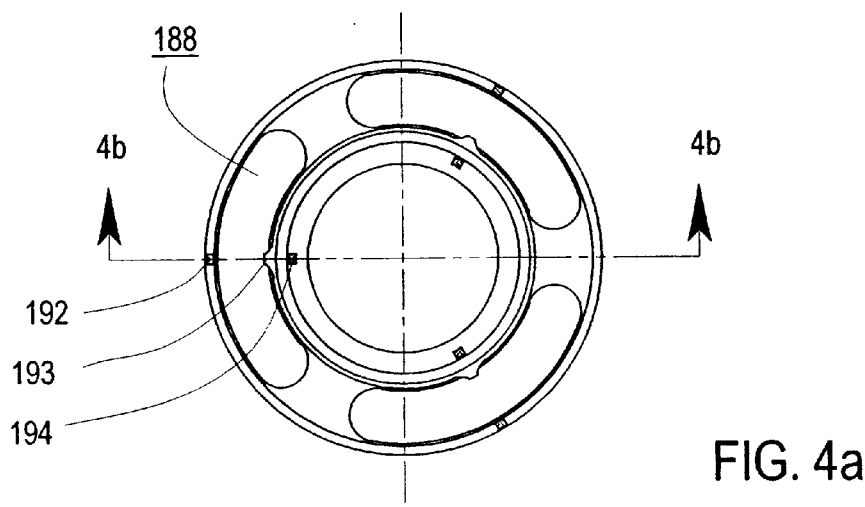
FIG. 4a is a top plan view of the inertia mass of the shock absorber of FIG. 2.
Figure 4B:
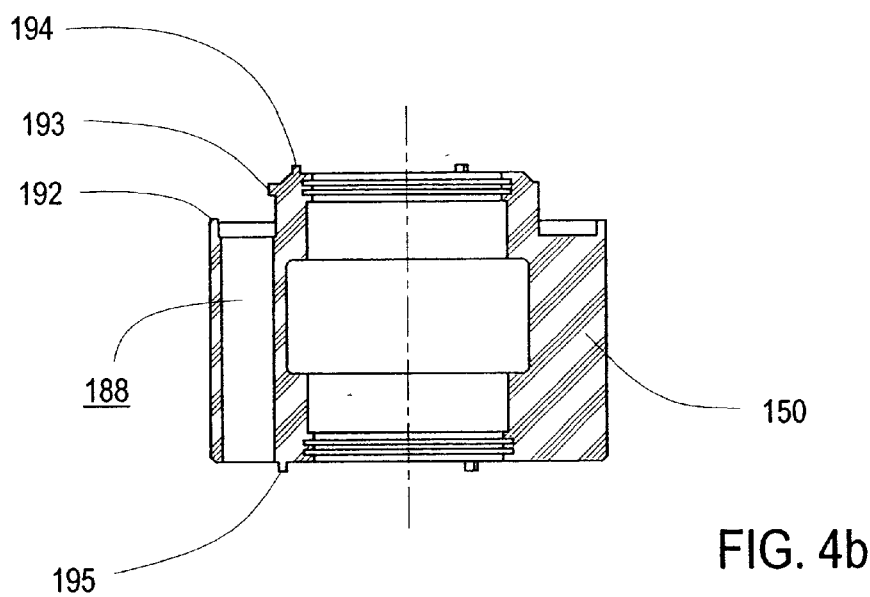
Figure 4C:
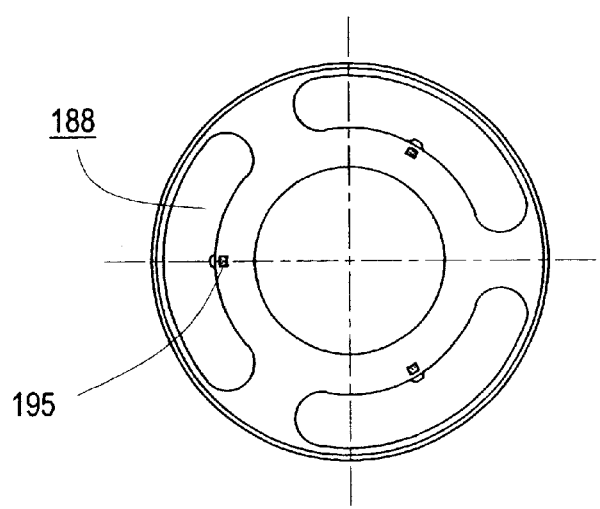
FIG. 4c is a bottom plan view of the inertia mass of FIG. 2.

With reference to FIG. 4a, a top plan view of the inertia mass 150 is shown. The axial passages 188 are preferably kidney-shaped, to allow the passages 188 to occupy a large portion of the transverse cross-sectional area of the inertia mass 150. Desirably, the ratio of the passage 188 cross-sectional area to the inertia mass 150 cross-sectional area is greater than approximately 0.3. Preferably, the ratio of the passage 188 cross-sectional area to the inertia mass 150 cross-sectional area is greater than approximately 0.5, and more preferably greater than approximately 0.7.

The large area of the passages 188 provides a low-resistance flow path for hydraulic fluid exiting the pocket 182. As a result, the flow rate of the fluid exiting the pocket 182 is high, and the inertia mass is able to move rapidly into the open position. In addition, the amount of fluid which must be displaced by the inertia mass 188 for it to move into the open position is reduced. Advantageously, such an arrangement allows the inertia mass 150 to respond rapidly to acceleration forces.

When the check plate 190 is resting against the standoff feet 192 on the upper surface of the inertia mass 150 it provides restricted fluid flow through the passages 188. The check plate 190 also has an open position in which it moves upward relative to the inertia mass 150 until it contacts the stop projections 193. When the check plate 190 is open, fluid is able to flow from the pocket 182 through the passages 188 and into the reservoir 128, with desirably low resistance.

The inertia mass 150 also includes a third series of projections, or standoff feet, 194. The standoff feet 194 are comprised of one or more projections located on the uppermost surface of the upper neck portion of the inertia mass 150. The standoff feet 194 on the upper surface of the neck portion of the inertia mass 150 contact the washer 156 when the inertia mass 150 is in its uppermost or closed position. A fourth set of projections, or standoff feet, 195 are positioned on the lower surface of the inertia mass 150 (FIG. 4c) and contact the shoulder 184 when the inertia mass 150 is in its lower or open position.

In each set of stop projections, or standoff feet, 192–195, preferably between three to five individual projections are disposed radially about the inertia mass 150. However, other suitable numbers of feet may also be used. Desirably, the surface area of the stop projections, or standoff feet, 192–195 is relatively small. A small surface area of the standoff feet 194, 195 lowers the resistance to movement of the inertia mass 150 by reducing the overall surface contact area between the inertia mass 150 and the washer 156 or shoulder 184, respectively. The small surface area of the standoff feet 192 and stop projections 193 lower the resistance to movement of the check plate 190 relative to the inertia mass 150. Desirably, the projections 192–195 have dimensions of less than approximately 0.025"×0.0258". Preferably, the projections 192–195 have dimensions of less than approximately 0.020"×0.020" and, more preferably, the projections 192–195 have dimensions of less than approximately 0.015"×0.015".

When utilized with an inertia mass 150 having a mass (weight) of approximately 0.5 ounces, the preferred projections 192–195 provide a desirable ratio of the mass (weight) of the inertia valve mass 150 to the contact surface area of the projections 192–195. Due to the vacuum effect between two surfaces, a force of approximately 14.7 lbs/in$^2$ (i.e., atmospheric pressure) is created when attempting to separate the inertia mass 150 from either the washer 156 or shoulder 184, respectively. By lowering the contact surface area between the inertia mass 150 and either the washer 156 or shoulder 184, the vacuum force tending to resist separation of the contact surfaces is desirably reduced.

Preferably, the contact surface area is small in comparison with the mass (weight) of the inertia mass 150 because the magnitude of the acceleration force acting on the inertia mass 150 is proportional to it's mass (weight). Accordingly, a large ratio of the mass (weight) of the inertia valve mass 150 to the contact surface area of the projections 192–195 is desired. For example, for a set of three (3) standoff feet 194, 195 with dimensions of approximately 0.025"×0.025", the ratio is at least approximately 17 lbs/in$^2$. A more desirable ratio is at least approximately 25 lbs/in$^2$. Preferably, the ratio is at least 50 lbs/in$^2$ and more preferably is at least 75 lbs/in$^2$. These ratios are desirable for an inertia mass utilized in the context of an off-road bicycle rear shock absorber and other ratios may be desirable for other applications and/or vehicles. Generally, however, higher ratios increase the sensitivity of the inertia mass 150 (i.e., allow the inertia mass 150 to be very responsive to acceleration forces). For example, with a ratio of 50 lbs/in$^2$ the sensitivity of the inertia mass 150 is about +/−1/3 G. Likewise, for a ratio of 147 lbs/in$^2$ the sensitivity of the inertia mass 150 is about +/−1/10 G.

Figure 6:
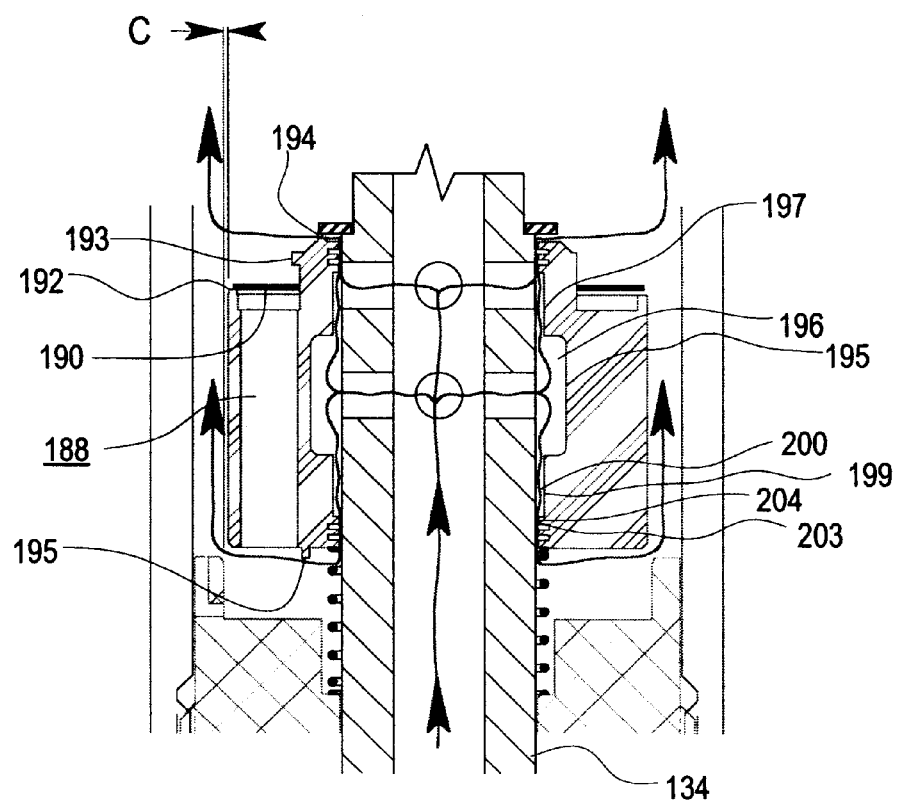
FIG. 6 is an enlarged cross-section of the inertia valve of the shock absorber of FIG. 2.

As illustrated in FIG. 6, the outside diameter of the lower portion of the inertia mass 150 is slightly smaller than the diameter of the pocket 182. Therefore, an annular clearance space is defined between them when the inertia mass 150 is positioned within the pocket 182. The clearance C restricts the rate with which fluid may pass to fill the pocket below the inertia mass 150, to influence the rate at which the inertia mass 150 may exit the pocket 182.

The interior surface of the inertia mass 150 includes an increased diameter central portion 195 which, together with the shaft 134, defines an annular recess 196. The annular recess 196 is preferably located adjacent to one or more of the ports 148 when the inertia mass 150 is in its closed position. Thus, fluid exiting from the shaft passage 136 through the passages 148 enters the annular recess 196 when the inertia mass 150 is its closed position.

The interior surface of the inertia mass 150 decreases in diameter both above and below the central portion 195 to create an upper intermediate portion 197 and a lower intermediate portion 199. The upper intermediate portion 197 and lower intermediate portion 199, together with the shaft 134, define an upper annular clearance 198 (FIG. 7*a*) and a lower annular clearance 200, respectively. An upper lip 201 (FIG. 7*a*) is positioned above, and is of smaller diameter than, the upper intermediate portion 197. A step 205 (FIG. 7*a*) is defined by the transition between the upper intermediate portion 197 and the upper lip 201. Similarly, a lower lip 203 is positioned below, and has a smaller diameter than, the lower intermediate portion 199. A step 205 is defined by the transition between the lower intermediate portion 199 and the lower lip 203. The upper lip 201 and the lower lip 203, together with the shaft 134, define an upper exit clearance 202 (FIG. 7*a*) and a lower exit clearance 204.

Figure 7A:
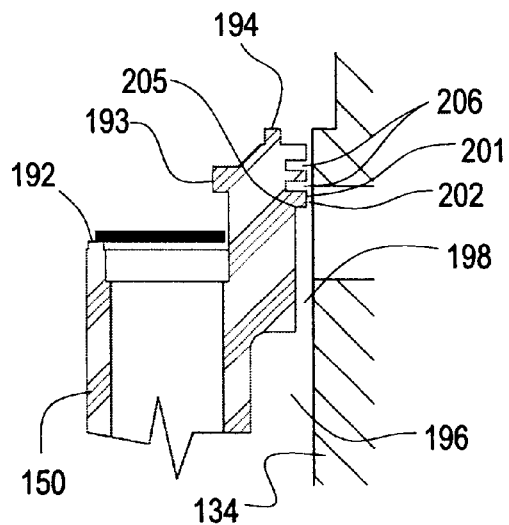
FIG. 7a is an enlarged view of a portion of the inertia valve of FIG. 6.

With reference to FIG. 7*a*, the upper lip 201 preferably includes a labyrinth seal arrangement 206. As is known, a labyrinth seal comprises a series of annular grooves formed into a sealing surface. Preferably, the lower lip 203 also includes a labyrinth seal arrangement substantially similar to the labyrinth seal 206 of the upper lip 201.

Advantageously, the labyrinth seal arrangement 206 reduces fluid flow (bleed flow) between the reservoir shaft 134 and the upper lip 201 when the inertia mass 150 is in a closed position. Excessive bleed flow is undesired because it reduces the damping rate when the inertia valve 138 is closed. By utilizing a labyrinth seal 206, the clearance between the inertia mass 150 and the shaft 134 may be increased, without permitting excessive bleed flow. The increased clearance is particularly beneficial to prevent foreign matter from becoming trapped between the inertia mass 150 and shaft 134 and thereby inhibiting operation of the inertia valve 138. Thus, reliability of the shock absorber 38 is increased, while the need for routine maintenance, such as changing of the hydraulic fluid, is decreased.

Figure 7B:
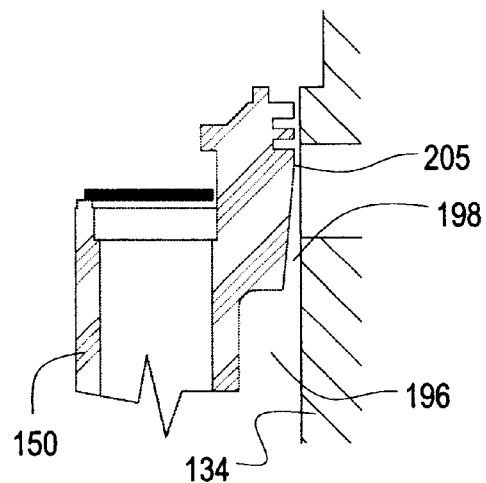
FIG. 7b is an enlarged view of a portion of an alternative inertia valve.

With reference to FIG. 7*b*, an alternative inertia mass 150 is illustrated. The upper intermediate portion 197 of the inner surface of the inertia mass 150 of FIG. 7*b* is inclined with respect to the outer surface of the shaft 134, rather than being substantially parallel to the outer surface of the shaft 134 as in the inertia mass of FIG. 7*a*. Thus, in the inertia mass 150 of FIG. 7*b*, the step 205 is effectively defined by the entire upper intermediate portion 197. The inertia mass 150 configuration of FIG. 7*b* theoretically provides approximately one-half the self-centering force of the inertia mass 150 of FIG. 7*a*. In addition, other suitable configurations of the inner surface of the inertia mass 150 may be utilized to provide a suitable self-centering force, as will be apparent to one of skill in the art based on the disclosure herein. For example, the inclined surface may begin in an intermediate point of the upper intermediate portion 197. Alternatively, the step 205 may be chamfered, rather than orthogonal.

With reference to FIGS. 1–7, the operation of the shock absorber 38 will now be described in detail. As described previously, the shock absorber 38 is operably mounted between the main frame 24 and the swing arm portion 26 of the bicycle 20 and is capable of both compression and rebound motion. Preferably, the shock body 42 portion of the shock absorber 38 is connected to the swing arm portion 26 and the air sleeve 40 is connected to the main frame 24. The reservoir 44 is desirably connected to the swing arm portion 26 of the bicycle 20 preferably near the rear axle, and preferably approximately vertical as shown in FIG. 1.

When the rear wheel 30 of the bicycle 20 encounters a bump the swing arm portion 26 articulates with respect to the main frame 24, tending to compress the shock absorber 38. If the acceleration imparted along the longitudinal axis of the reservoir 44 is below a predetermined threshold, the inertia mass 150 will remain in its closed position, held by the biasing force of the spring 152, as illustrated in FIG. 3*b*.

For the piston 68 to move relative to the shock body 42 (i.e., compression motion of the shock absorber 38) a volume of fluid equal to the displaced volume of the shock shaft 70 must be transferred into the reservoir 128. With the inertia mass 150 closing the passages 148 and the blowoff valve 140 remaining in a closed position, fluid flow into the reservoir 128 is substantially impeded and the shock absorber 38 remains substantially rigid.

If the compressive force exerted on the rear wheel 30, and thus the shock absorber 38, attains a level sufficient to raise the fluid pressure within the blowoff chamber 170 above a predetermined threshold, such as 800 psi for example, the blowoff shims 178 open to allow fluid to flow from the blowoff chamber 170 through the blowoff ports 174 and into the reservoir 128. As an example, if the diameter of the shock shaft 70 is ⅝" (Area=0.31 square inches) and the predetermined blow-off threshold is 800 psi, then a compressive force at the shaft of at least 248 pounds is required to overcome the blowoff threshold and commence compression of the shock absorber. This required force, of course, is in addition to the forces required, as is known in the art, to overcome the basic spring force and the compression damping forces generated at the piston 68 of the shock absorber. In this situation, compression of the shock absorber is allowed against the spring force produced by the combination of the positive and negative air chambers 86, 88. The damping rate is determined by the flow through the compression ports 104 of the piston 68 against the biasing force of the compression shim stack 106. When the pressure within the blowoff chamber 170 falls below the predetermined threshold, the blowoff shim stack 178 closes the blowoff ports 174 and the shock absorber 38 again becomes substantially rigid, assuming the inertia mass 150 remains in the closed position.

If the upward acceleration imposed along the longitudinal axis of the reservoir 44 (i.e., the axis of travel of the inertia mass 150) exceeds the predetermined minimum threshold, the inertia mass 150, which tends to remain at rest, will overcome the biasing force of the spring 152 as the reservoir 44 moves upward relative to the inertia mass 150. If the upward distance of travel of the reservoir 44 is sufficient, the inertia mass will move into the pocket 182. With the inertia mass 150 in the open position, fluid is able to be displaced from the compression chamber 96 through the passages 112, 114 and the shaft passage 136, through the passages 148 and into the reservoir 128. Thus, the shock 38 is able to compress with the compression damping force again being determined by flow through the compression ports 104 of the piston 68.

The predetermined minimum threshold for the inertia mass 150 to overcome the biasing force of the spring 152 is determined primarily by the mass of the inertia mass 150, the spring rate of the spring 152 and the preload on the spring 152. Desirably, the mass of the inertia mass is approximately 0.5 ounces. However, for other applications, such as the front suspension fork 34 or vehicles other than off-road bicycles, the desired mass of the inertia mass 150 may vary.

The spring rate of the spring 152 and the preload on the spring 152 are preferably selected such that the spring 152 biases the inertia mass 150 into a closed position when no upward acceleration is imposed along the longitudinal axis of the reservoir 44. However, in response to such an acceleration force the inertia mass 150 will desirably overcome the biasing force of the spring 152 upon experiencing an acceleration which is between 0.1 and 3 times the force of gravity (G's). Preferably, the inertia mass 150 will overcome the biasing force of the spring 152 upon experiencing an acceleration which is between 0.25 and 1.5 G's and more preferably upon experiencing an acceleration which is between 0.4 and 0.7 G's. For certain riding conditions or other applications, such as the front suspension fork 34, or other applications besides off-road bicycles, however, the predetermined threshold may be varied from the values recited above.

The check plate 190 resting on the standoff feet 193 of the inertia mass 150 allows fluid to be easily displaced upward from the pocket 182 and thus allows the inertia mass 150 to move into the pocket 182 with little resistance. This permits the inertia mass 150 to be very responsive to acceleration inputs. As the inertia mass 150 moves into the pocket 182, fluid within the pocket 182 flows through the passages 188 and lifts the check plate 190 against the stop projections 193.

Once the inertia mass 150 is in its open position within the pocket 182, as illustrated in FIG. 5, the spring 152 exerts a biasing force on the inertia mass 150 tending to move it from the pocket 182. Fluid pressure above the inertia mass 150 causes the check plate 190 to engage the standoff feet 192 located on the upper surface of the inertia mass 150 restricting flow through the ports 188. The height of the standoff feet 192 which the check plate 190 rests on is typically 0.003" to 0.008" above the exit surface of the passages 188 to provide an adequate level of flow restriction upon upward movement of the inertia mass 150. Fluid may be substantially prevented from flowing through the passages 188 and into the pocket 182, except for a small amount of bleed flow between the checkplate 190 and the upper surface of the inertia mass 150. However, the height of the standoff feet 192 may be altered to influence the flow rate of the bleed flow and thereby influence the timer feature of the inertia mass 150, as will be described below.

Fluid also enters the pocket 182 through the annular clearance, or primary fluid flow path, C (FIG. 6) between the interior surface, or valve seat, of the pocket 182 and the exterior surface of the inertia mass 150. Thus, the size of the clearance C also influences the rate at which fluid may enter the pocket 182 thereby allowing the inertia mass 150 to move upward out of the pocket 182.

Advantageously, with such a construction, once the inertia mass 150 is moved into an open position within the pocket 182, it remains open for a predetermined period of time in which it takes fluid to refill the pocket behind the inertia mass 150 through the clearance C. This is referred to as the "timer feature" of the inertia valve assembly 138. Importantly, this period of time can be independent of fluid flow direction within the shock absorber 38. Thus, the shock absorber 38 may obtain the benefits of a reduced compression damping rate throughout a series of compression and rebound cycles, referred to above as "modal response." Desirably, the inertia mass 150 remains in an open position for a period between approximately 0.05 and 5 seconds, assuming no subsequent activating accelerations are encountered. Preferably, the inertia mass 150 remains in an open position for a period between about 0.1 and 2.5 seconds and more preferably for a period between about 0.2 and 1.5 seconds, again, assuming no subsequent accelerations are encountered which would tend to open the inertia mass 150, thus lengthening or resetting the timer period. The above values are desirable for a rear shock absorber 38 for an off-road bicycle 20. The recited values may vary in other applications, however, such as when adapted for use in the front suspension fork 34 or for use in other vehicles or non-vehicular applications.

Figure 8:
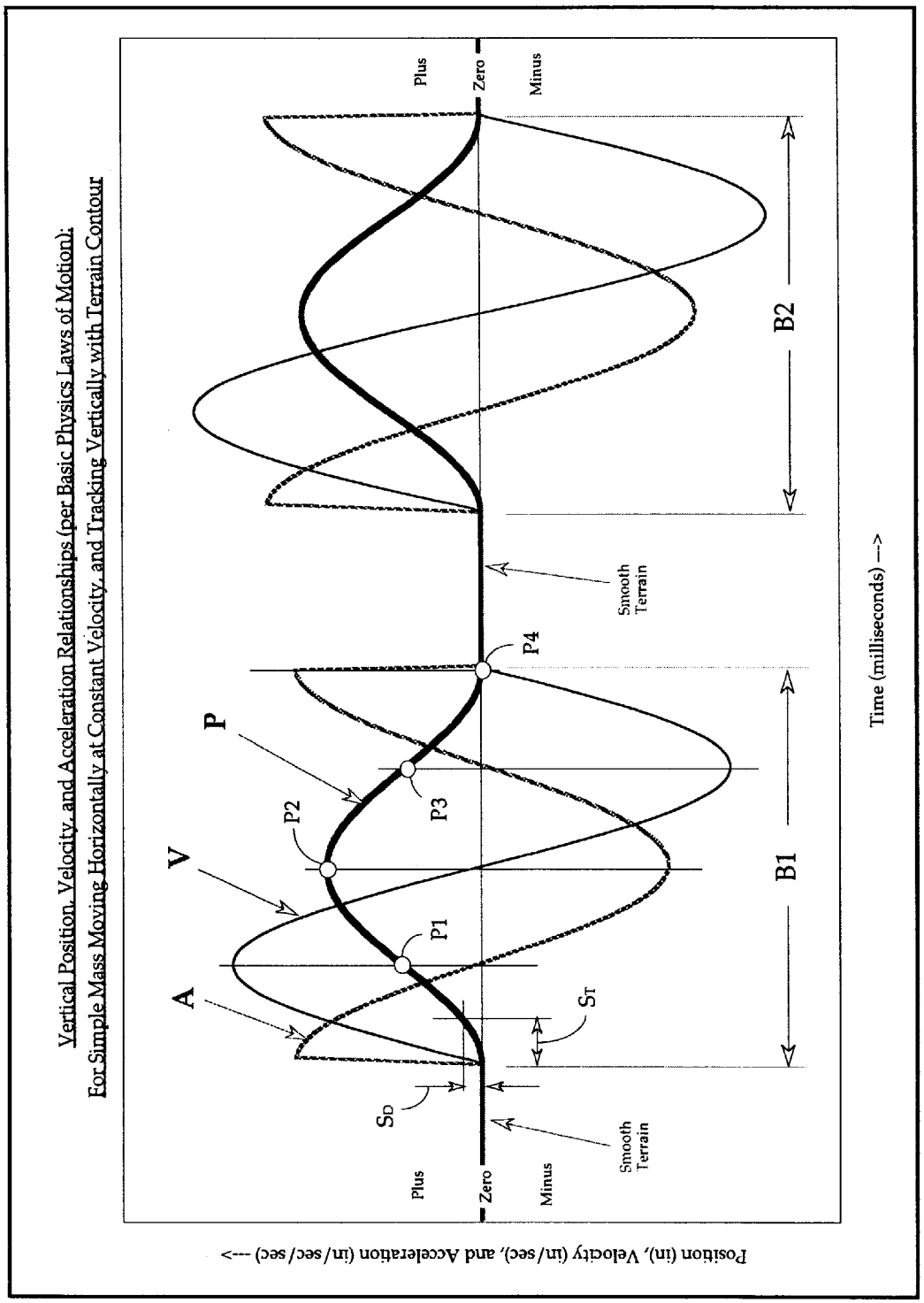
FIG. 8 is a graph illustrating the relationship between position, velocity and acceleration for a simple mass.

In order to fully appreciate the advantages of the modal response inertia valve assembly 138 of the present shock absorber 38, it is necessary to understand the operation of a bicycle having an acceleration-sensitive damping system utilizing an inertia valve. With reference to FIG. 8, the relationship between vertical position P, vertical velocity V and vertical acceleration A, over time T, for a simple mass traversing two sinusoidally-shaped bumps is illustrated. FIG. 8 is based on a mass that travels horizontally at a constant velocity, while tracking vertically with the terrain contour. This physical model, somewhat simplified for clarity, correctly represents the essential arrangement utilized in inertia-valve shock absorbers wherein the inertial element is directly connected to, and driven by, the unsprung mass.

The primary simplification inherent in this model, and in this analysis, is that the flexibility of an actual bicycle tire is ignored. The tire is assumed to be inflexible in its interaction with the terrain, offering no compliance. An actual tire, of course, will provide some compliance, which in turn produces some degree of influence on the position, velocity, and acceleration of the unsprung mass. The actual degree of influence in a given situation will depend on many variables, including the actual vehicle speed and the specific bump geometry, as well as the compliance parameters of the particular tire. However, the simplified analysis discussed here is a good first approximation which clearly illustrates the key operative physics principles, while avoiding these complications. The basic validity of this simplified analysis can be demonstrated by a sophisticated computer motion analysis that incorporates the effects of tire compliance and several other complicating factors.

Relating FIG. 8 to the situation of a bicycle, the heavy solid line indicating position P represents both the trail surface and, assuming the wheel of the bicycle is rigid and remains in contact with the trail surface, the motion of any point on the unsprung portion of the bicycle, such as the hub axis of the front or rear wheel, for example. The lines representing velocity V and acceleration A thus correspond to the vertical velocity and acceleration of the hub axis. In FIG. 8, the trail surface (solid line indicating position P) includes a first bump B1 and a second bump B2. In this example, as shown, each bump is preceded by a short section of smooth (flat) terrain.

As the wheel begins to traverse the first bump B1, the acceleration A of the hub axis H rises sharply to a maximum value and, accordingly, the velocity V of the hub axis H increases. Mathematically, of course, the acceleration as shown is calculated as the second derivative of the sinusoidal bump curve, and the velocity as the first derivative. At a point P1, approximately halfway up the first bump B1, the second derivative (acceleration A) becomes negative (changes direction) and the velocity begins to decrease from a maximum value. At a point P2, corresponding with the peak of the bump B1, the acceleration A is at a minimum value (i.e., large negative value) and the velocity V is at zero. At a point P3, corresponding with the mid-point of the downside of the first bump B1, the acceleration A has again changed direction and the velocity V is at a minimum value (i.e., large negative value). At a point P4, corresponding with the end of the first bump B1, the acceleration A has risen again to a momentary maximum value and the velocity V is zero. The second bump B2 is assumed to be sinusoidally-shaped like the first bump B1, but, as shown, to have somewhat greater amplitude. Thus, the relationship between position P, velocity V and acceleration A are substantially identical to those of the first bump B1.

When a simple inertia valve is utilized in the suspension system of a bicycle and the acceleration A reaches a threshold value, the inertia mass overcomes the biasing force of the spring and remains in a substantially stationary position as the shaft which supports the inertia mass moves upward. Once the shaft has moved upward relative to the inertia mass a sufficient distance, the inertia valve passages are uncovered and a reduced compression damping rate is achieved. Although a compression inertia valve is discussed in this example, the same principles may be applied to an inertia valve which operates during rebound.

Before the inertia valve passages are open, the shock absorber operates at its initial, firm damping rate. This results in an undesirably firm damping rate, creating a "damping spike", over the initial portion of the bump B1. The damping spike continues until the shaft has moved upward relative to the inertia mass a sufficient distance to open the valve passages. The amount of movement of the shaft relative to the inertia mass necessary to uncover the passages is determined primarily by the size of the passages and the position of the uppermost surface of the inertia mass relative to the passages when the mass is in its fully closed position. This distance is referred to as the spike distance $S_D$. The amount of time necessary for the inertia passages to be opened and to reduce the damping rate is dependent upon the shape of the bump and the spike distance $S_D$, and is referred to as the spike time $S_T$. The reduction of the damping rate is at least partially dependent upon the size of the passages and, therefore, it is difficult to reduce the spike time $S_T$ without reducing the spike distance $S_D$ which necessarily affects the achievable lowered damping rate.

The inertia mass begins to close (i.e., move relatively upward) when the acceleration acting upon it either ceases, changes direction, or becomes too small to overcome the biasing force of the spring. As shown graphically in FIG. 8, the acceleration A becomes zero at point P1, or at approximately the mid-point of the bump B1. Accordingly, a simple inertia valve begins to close at, or before, the middle of the bump B1. Therefore, utilizing a simple inertia valve tends to return the shock absorber to its initial, undesirably firm damping rate after only about one-half of the bump B1 has been traversed. The operating sequence of the inertia valve is similar for the second bump B2 and each bump thereafter.

In actual practice, the specific point on a bump where a simple inertia valve will close will vary depending on bump configuration, vehicle speed, inertia valve size and geometry, spring bias force, compliance of the tire and other factors. Thus, it should be understood that the extent of mid-bump "spiking" produced by "premature closing" of a simple inertia valve will be greater for some bumps and situations than for others.

It is desirable to extend the amount of time the inertia valve stays open so that the reduced damping rate can be utilized beyond the first half of the bump. More complex inertia valve arrangements utilize the fluid flow during compression or rebound motion to hydraulically support the inertia valve in an open position once acceleration has ceased or diminished below the level necessary for the inertia valve to remain open from acceleration forces alone. However, these types of inertia valve arrangements are dependent upon fluid flow and allow the inertia valve to close when, or slightly before, the compression or rebound motion ceases. A shock absorber using this type of inertia valve in the compression circuit could experience a reduced damping rate from after the initial spike until compression motion ceases at, or near, the peak P2 of the bump B1. This would represent an improvement over the simple inertia valve shock absorber described previously. However, the flow dependent inertia valve necessarily reacts to specific terrain conditions. That is, the inertia mass responds to each individual surface condition and generally must be reactivated upon encountering each bump that the bicycle traverses. Therefore, this type of shock absorber experiences an undesirably high damping rate "spike" as each new bump is encountered.

In contrast, the inertia valve arrangement 138 of the present shock absorber 38 is a modal response type. That is, the inertia valve 138 differentiates rough terrain conditions from smooth terrain conditions and alters the damping rate accordingly. During smooth terrain conditions, the inertia valve 138 remains in a closed position and the damping rate is desirably firm, thereby inhibiting suspension motion due to the movement of the rider of the bicycle 20. When the first bump B1 is encountered, the inertia valve 138 opens to advantageously lower the damping rate so that the bump may be absorbed by the shock absorber 38. The timer feature retains the inertia valve 138 in an open position for a predetermined period of time thereby allowing the shock absorber 38 to maintain the lowered damping rate for the entire bump (not just the first half), and to furthermore absorb the second bump B2 and subsequent bumps possibly without incurring any additional "spikes." As discussed above, the timer period may be adjustable by altering the rate at which fluid may refill the timer pocket 182.

Once the shock absorber 38 has been compressed, either by fluid flow through the blowoff valve 140 or the inertia valve 138, the spring force generated by the combination of the positive air chamber 86 and the negative air chamber 88 tend to bias the shock body 42 away from the air sleeve 40. In order for the shock absorber 38 to rebound, a volume of fluid equal to the displaced volume of the shock shaft 70 must be drawn from the reservoir 128 and into the compression chamber 96. Fluid flow is allowed in this direction through the refill ports 176 in the blowoff valve 140 against a desirably light resistance offered by the refill shim stack 180. Gas pressure within the gas chamber 130 exerting a force on the floating piston 124 may assist in this refill flow. Thus, the rebound damping rate is determined primarily by fluid flow through the rebound passages 108 against the biasing force of the rebound shim stack 110.

With reference to FIGS. 3b and 5, the fluid flow path during compression or rebound motion of the shock absorber 38, with the inertia mass 150 in either of an open or closed position, is above and away from the inertia mass 150 itself. Advantageously, such an arrangement substantially isolates fluid flow from coming into contact with the inertia mass 150, thereby inhibiting undesired movement of the inertia mass due to drag forces resulting from fluid flow. Thus, the inertia mass 150 advantageously responds to acceleration inputs and is substantially unaffected by the movement of hydraulic fluid during compression or rebound of the shock absorber 38.

The present shock absorber 38 includes an inertia valve 138 comprising a self-centering valve body, or inertia mass 150. In order to fully appreciate the advantages of the self-centering inertia mass 150 of the present inertia valve assembly 138, it is necessary to describe the conditions which have prevented prior inertia valve designs from operating reliably, with acceptable sensitivity, and for a reasonable cost.

Figure 9:
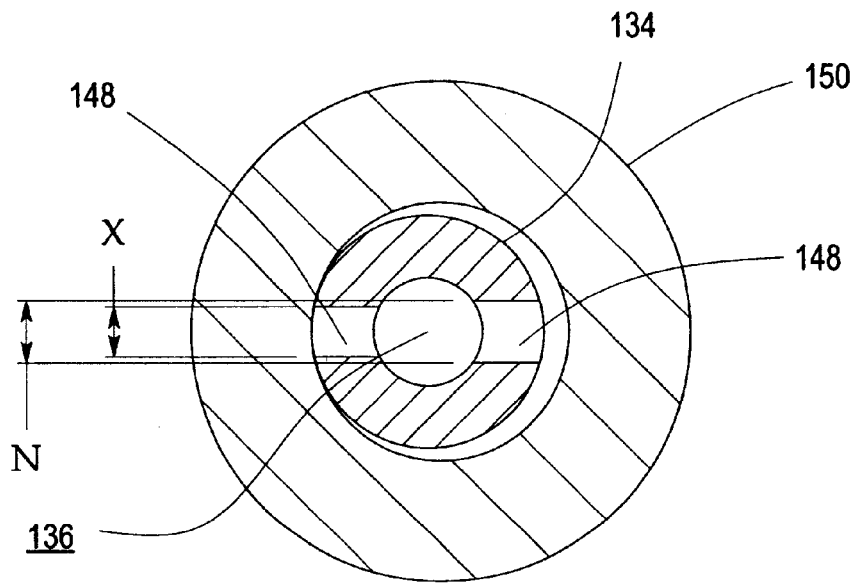
FIG. 9 is a schematic illustration of an inertia valve in an off-center condition.
Figure 10:
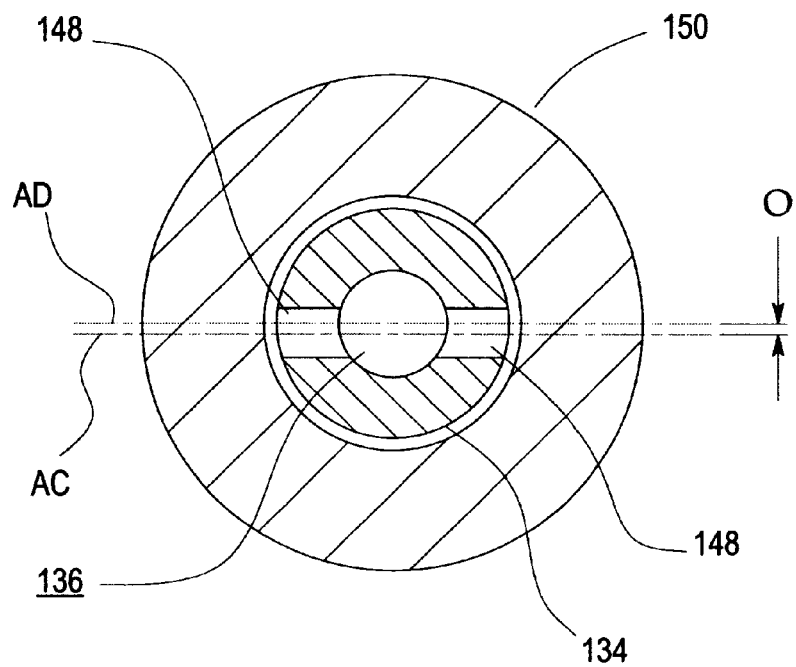
FIG. 10 is a schematic illustration of an inertia valve in a second off-center condition.

Each of FIGS. 9 and 10 schematically illustrate an off-center condition of the inertia mass 150 relative to the shaft 134. The off-center condition of the inertia mass 150 may cause it to contact the shaft 134 causing friction, which tends to impede motion of the inertia mass 150 on the shaft 134. Due to the relatively small mass of the inertia mass 150 and the desirability of having the inertia mass 150 respond to small accelerations, any friction between the inertia mass 150 and the shaft 134 seriously impairs the performance of the inertia valve 138 and may render it entirely inoperable. Each of the off-center conditions illustrated in FIGS. 8 and 9 may result from typical manufacturing processes. However, modifying the manufacturing process to avoid these conditions often results in a prohibitively high manufacturing cost.

FIG. 9 illustrates an inertia valve arrangement in which the inertia valve passages 148 are of slightly different diameter. Such a condition is often an unavoidable result of the typical manufacturing process of drilling in a radial direction through a tubular piece of material. Such a process may result in an entry diameter N created by the drilling tool being slightly larger than the exit diameter X created by the drilling tool. The resulting difference in area between the passages 148 causes the fluid pressure within the shaft passage 136 to exert an unequal force between the entry passage 148 having an entry diameter N and the exit passage 148 having an exit diameter X.

For example, a difference between the entry diameter N and the exit diameter X of only two thousandths of an inch (0.090" exit diameter versus 0.092" entry diameter) at a fluid pressure of 800 psi, results in a force differential of approximately 0.2 pounds, or 3.6 ounces, between the passages 148. The inertia mass 150 itself may weigh only about one half of an ounce (0.5 oz.). Such a force differential will push the inertia mass 150 off-center and reduce the responsiveness of the inertia mass 150, if not prevent it from moving entirely.

FIG. 10 illustrates an off-center condition of the inertia mass 150 caused by the inertia valve passages 148 being positioned off-center relative to the shaft 134. A center axis AC of the inertia valve passages 148 is offset from the desired diametrical axis AD of the shaft 134 by a distance O. Therefore, the force resulting from fluid pressure within the shaft passage 136 does not act precisely on a diametrical axis AD of the inertia mass 150, resulting in the inertia mass 150 being pushed off-center with respect to, and likely contacting, the shaft 134. The offset condition of the center axis AC of the passages 148 is the result of inherent manufacturing imperfections and cannot easily be entirely avoided, at least without raising the cost of manufacturing to an unfeasible level.

Furthermore, even if manufacturing costs were not of concern and the passages 148 could be made with identical diameters and be positioned exactly along the diametrical axis AD of the shaft 134, additional forces may tend to push the inertia mass 150 off-center. For example, if the reservoir 44 experiences an acceleration which is not exactly aligned with the axis of travel of the inertia mass 150 (such as braking or forward acceleration), the transverse component of the acceleration would create a force tending to move the inertia mass 150 off-center and against the shaft 134. If the transverse component of the acceleration is large enough, the resulting frictional force between the inertia mass 150 and the reservoir shaft 134 will inhibit, or prevent, movement of the inertia mass 150. Accordingly, it is highly desirable to compensate for factors which tend to push the inertia mass 150 off-center in order to ensure responsive action of the inertia valve 138. This is especially important in off-road bicycle applications, where it is desirable for the inertia valve assembly 138 to respond to relatively small accelerations and the mass of the inertia mass 150 is also relatively small.

Figure 11:
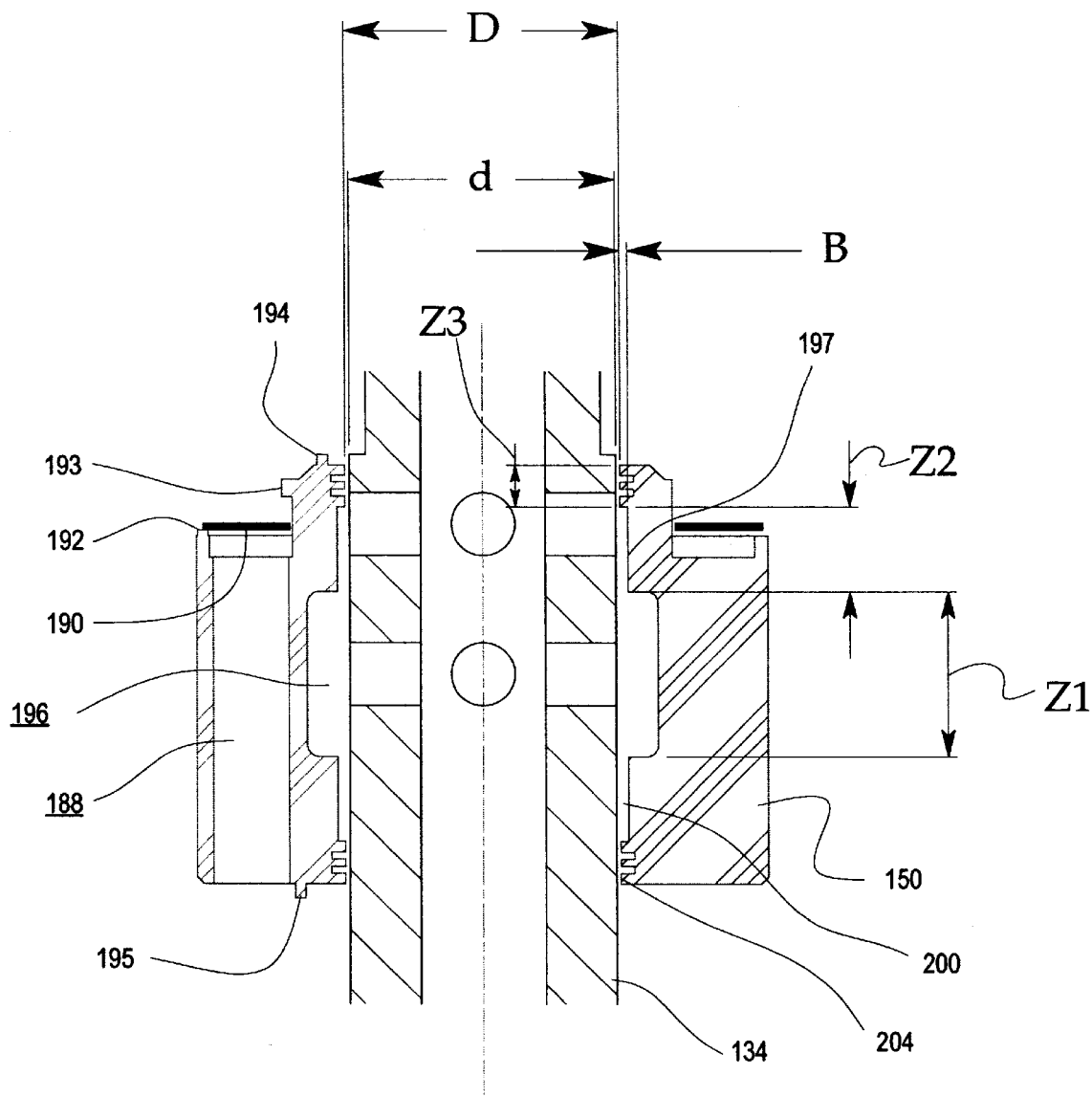
FIG. 11 is a cross-section view of the inertia valve of FIG. 3b showing various zones of cross-sectional fluid flow areas.

As described above, the inertia valve assembly 138 preferably includes a self-centering inertia mass 150. With reference to FIG. 11, the inertia mass 150 of FIG. 5 is shown without the fluid flow lines to more clearly depict the cross-sectional shape of its interior surface. The inertia mass 150 has a minimum internal diameter "D" while the shaft 134 has a constant external diameter "d," which is smaller than the internal diameter D. The difference between the shaft diameter d and the inertia valve diameter D is desirably small. Otherwise, as described above, the bleed flow between the shaft 134 and the inertia mass 150 undesirably reduces the damping rate which may be achieved when the inertia mass 150 is in a closed position. Accordingly, for the rear shock 38 the difference between the shaft diameter d and the inertia mass diameter D is desirably less than 0.01 inches. Preferably, difference between the shaft diameter d and the inertia mass diameter D is less than 0.004 inches and more preferably is approximately 0.002 inches. For the front suspension fork 34, the difference between the shaft diameter d and the inertia mass diameter D is desirably less than 0.02 inches. Preferably, difference between the shaft diameter d and the inertia mass diameter D is less than 0.008 inches and more preferably is approximately 0.004 inches. The recited values may vary in other applications, however, such as when adapted for vehicles other than off-road bicycles or non-vehicular applications.

The preferred differences between the shaft diameter d and the inertia mass diameter D recited above assume that a labyrinth seal arrangement 206 (FIG. 7) is provided at the upper and lower portions of the internal surface of the inertia mass 150, as described above. However, the bleed rate may be influenced by factors other than the difference between the shaft diameter d and the inertia mass diameter D. Accordingly, driven by a pressure differential of 400 psi, the bleed rate between the inertia mass 150 and the shaft 134, for an off-road bicycle shock with a shaft diameter of ⅝ inches, is desirably less than 1.0 cubic inches/sec. Preferably, the bleed rate between the inertia mass 150 and the shaft 134 is less than 0.5 cubic inches/sec and more preferably is less than 0.3 cubic inches/sec. However, for applications other than off-road bicycle shock absorbers, the preferred bleed rates may vary.

As described, an annular recess 196 is defined between the interior surface of the inertia mass 150 and the shaft 134. The annular recess 196 is preferably located in approximately the center of the inertia mass 150. The annular recess 196 is referred to as zone 1 ($Z_1$) in the following description of the fluid flow between the shaft 134 and the self-centering inertia mass 150. The upper annular clearance 198, above the annular recess 196, is referred to as zone 2 ($Z_2$) and the upper exit clearance 202 is referred to as zone 3 ($Z_3$). One half of the difference between the diameter of the upper annular clearance 198 and the diameter D at the upper exit clearance 202 defines a distance B, which is equivalent to the size of the step 205. The size B of the step 205 (referred to as a "Bernoulli Step" in FIGS. 26, 27 and 28) may be precisely manufactured by a computer controlled lathe operation, for example. Other suitable methods for creating a precisely sized step 205 may also be used.

Zone 1 $Z_1$ has a larger cross-sectional fluid flow area than zone 2 $Z_2$ which, in turn, has a larger cross-sectional flow area than zone 3 $Z_3$. The cross-sectional area differential between the zones $Z_1$, $Z_2$, $Z_3$ causes the fluid within each zone $Z_1$, $Z_2$, $Z_3$ to vary in velocity, which causes a self-centering force to be exerted on the inertia mass 150 when it becomes off-center, as will be described below. Although the zones $Z_1$, $Z_2$, $Z_3$ are annular, the discussion below is in the context of a two-dimensional structure having left and right sides. Accordingly, the zones $Z_1$, $Z_2$, $Z_3$ of the example will vary in cross-sectional distance, rather than in cross-sectional area. Although the example is simplified, it correctly describes the general self-centering action of the inertia mass 150.

A rough approximation of the centering force developed by the self-centering inertia mass 150 can be estimated using Bernoulli's equation. This is a rough approximation only since Bernoulli's equation assumes perfect frictionless flow, which is not valid for real fluids. However, this is a useful starting point for understanding the general principles involved, and for estimating the forces that occur. Bernoulli's equation expresses the law of conservation of energy for the flow of an incompressible fluid. In estimating the centering force of the inertia mass 150, the potential energy (height) portion of Bernoulli's equation is not significant and may be ignored. Thus, for any two arbitrary points on a fluid streamline, Bernoulli's equation reduces to:

$$P_1 + (\rho/g)(V_1)^2 = P_2 + (\rho/g)(V_2)^2$$

where:

$P_1$=fluid pressure (psi) at point 1
$P_2$=fluid pressure (psi) at point 2
$V_1$=fluid velocity (in/sec) at point 1
$V_2$=fluid velocity (in/sec) at point 2
$\rho$=fluid density
$g$=gravity constant Using the values of 0.3125 lb/in$^3$ for fluid density $\rho$ of typical hydraulic fluid and 386 in/sec$^2$ for gravity constant g, the equation becomes:

$$P_1 + (4.05 \times 10^{-5})(V_1)^2 = P_2 + (4.05 \times 10^{-5})(V_2)^2$$

For a simple example, assume that the fluid pressure $P_1$ in zone 1 is 400 psi, due to an external force tending to compress the shock absorber 38 and the fluid velocity $V_1$ is zero due to relatively little fluid exiting from zone 1. Also, for simplicity, assume that the floating piston 124 is absent or is not exerting a significant pressure on the fluid within the reservoir chamber 128. Accordingly, the fluid pressure $P_3$ in zone 3 $Z_3$ is 0 psi. Insert these values into Bernoulli's equation to find the velocity in zone 3:

$$400 + (4.05 \times 10^{-5})(0)^2 = 0 + (4.05 \times 10^{-5})(V_3)^2$$

$$V_3 = 3{,}142 \text{ in/sec}$$

Therefore, as a first approximation (accurate to the degree that the assumptions Bernoulli's equation are based upon are valid here) the velocity $V_3$ of fluid exiting zone 3 is 3,142 in/sec. Assuming the validity of assumptions inherent in Bernoulli's equation here, this value is true for all exit points of zone 3 $Z_3$ regardless of their dimensions. Further, based on flow continuity, the change in velocity of the fluid between zone 2 $Z_2$ and zone 3 $Z_3$ is proportional to the change in the clearance, or gap G, between zone 2 $Z_2$ and zone 3 $Z_3$. The gap G is the cross-sectional distance between the outer surface of the shaft 134 and the relevant inner surface of the inertia mass 150.

The relationship between the change in the size of the gap G and the change in velocity allows solving of the velocity in zone 2 $Z_2$ for both the right and left sides. Assuming that D is 0.379 inches, d is 0.375 inches and B is 0.001 inches, then the gaps on both the right and left sides, with the inertia mass 150 centered are:

GAP Zone $2 = B + (D-d)/2 = 0.003$

GAP Zone $3 = (D-d)/2 = 0.002$

Then, based on flow continuity, fluid velocity in Zone 2 is calculated as follows:

$$V_3 \left( \frac{GAP\, Zone\, 3}{GAP\, Zone\, 2} \right) = V_2 = 2{,}094 \text{ in/sec}$$

Therefore, the fluid velocity $V_2$ in zone 2 $Z_2$ for each of the right and left side is 2,094 in/sec. Using Bernoulli's equation to find the pressure $P_2$ in zone two gives:

$$400 + (4.05 \times 10^{-5})(0)^2 = (P_2) + (4.05 \times 10^{-5})(2{,}094)^2$$

$$P_2 = 222 \text{ psi}$$

Assuming that, for a particular inertia valve, the area in zone 2 $Z_2$ that the fluid pressure acts upon for each of the right and left side is 0.0375 in$^2$, then the force F at both the left and right sides of the inertia mass 150 can be calculated as:

$$F = 222 \text{ psi } (0.0375 \text{ in}^2) = 8.3 \text{ lbs.}$$

The force F acting on the inertia mass 150 in the above example is equal for the right and left side due to the velocity $V_2$ in zone 2 $Z_2$ being the same for each side. The velocity $V_2$ is the same because the ratio of gap 3 $G_3$ to gap 2 $G_2$ between the right side and the left side is equal due to the inertia mass 150 being centered relative to the shaft 134.

Figure 12:
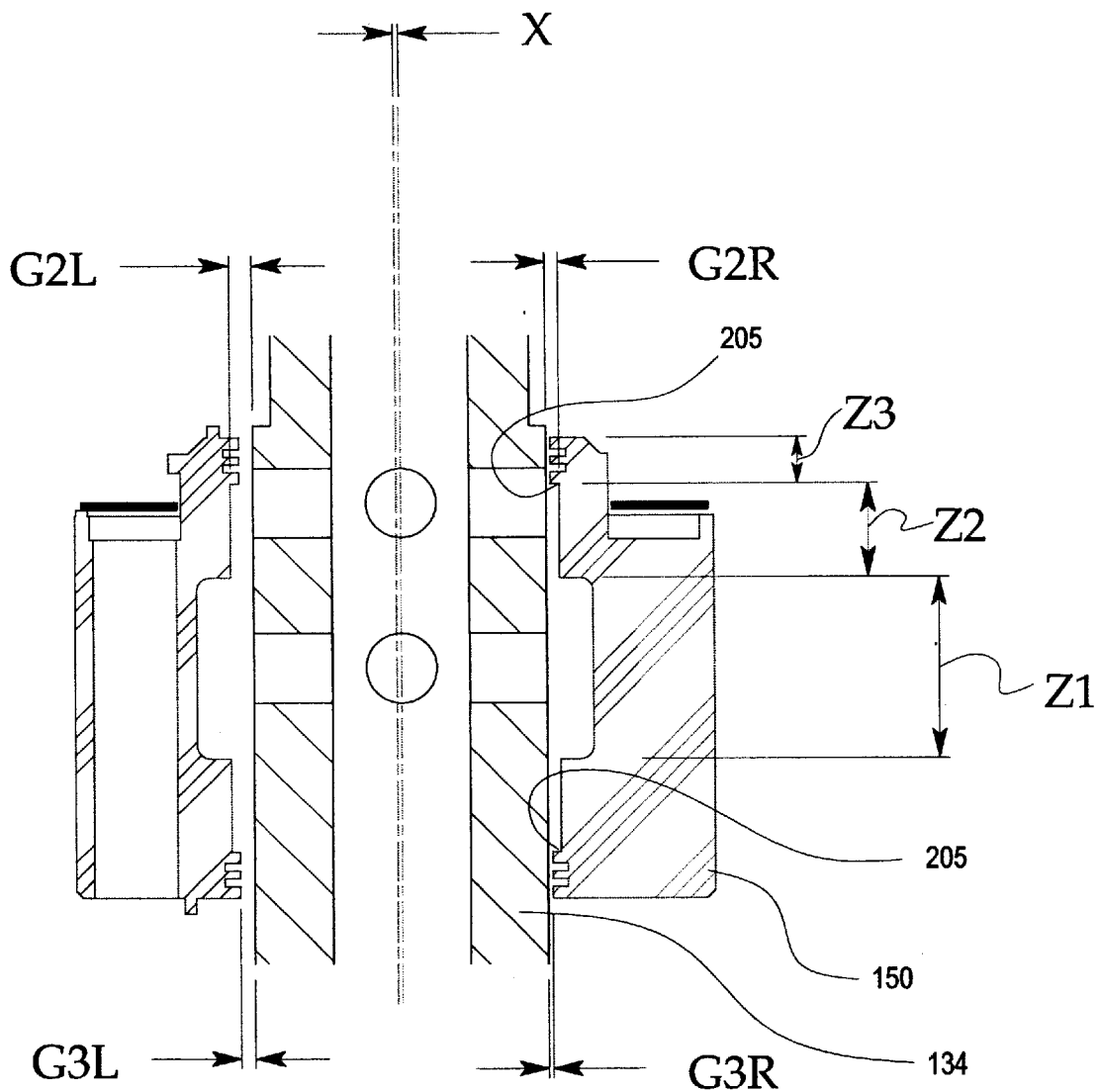
FIG. 12 is a cross-section view of the inertia valve of FIG. 3b in an off-center condition.

With reference to FIG. 12, however, if the inertia mass 150 becomes off center relative to the shaft 134 by a distance x, for example 0.001 inches to the left, the ratio of gap 3 $G_3$ to gap 2 $G_2$ is different between the right and left sides. This results in the velocity $V_2$ being different between the right and left sides and, as a result, a force differential between the right side and left side is produced. These calculations are substantially similar to the previous calculations and are provided below (for an off-center condition 0.001 inches to the left:

$V_3 = 3,142$ in/sec

Left Side:

$GAP\ Zone\ 3\ (G_{3L}) = (D-d)/2 + x = 0.003$ $GAP\ Zone\ 2\ (G_{2L}) = B + (D-d)/2 + x = 0.004$ $V_3 \left( \dfrac{GAP\ Zone\ 3}{GAP\ Zone\ 2} \right) = V_2 = 2356.5$ in/sec $P_2 = 175$ psi $F = (175)(0.0375) = 6.55$ lbs.

Right Side:

$GAP\ Zone\ 3\ (G_{3R}) = (D-d)/2 - x = 0.001$ $GAP\ Zone\ 2\ (G_{2R}) = B + (D-d)/2 - x = 0.002$ $V_3 \left( \dfrac{GAP\ Zone\ 3}{GAP\ Zone\ 2} \right) = V_2 = 1571$ in/sec $P_2 = 300$ psi $F = (300)(0.0375) = 11.25$ lbs.

$F_{right} - F_{left} = 4.7$ lbs. pushing right

As shown, a force differential of as much as 4.7 lbs, depending on the degree of validity of the Bernoulli assumption, pushes the inertia mass 150 to the right to correct for the off-center condition. As noted above, preferably the lower portion of the inertia mass 150 also includes a step 205 creating a lower zone 2 and zone 3 (FIG. 12). Accordingly, a centering force acts on the lower portion of the inertia mass 150 when it is off-center from the shaft 134. Therefore, in the example above, a force of as much as 4.7 lbs also acts on the lower portion of the inertia mass 150, resulting in a total centering force of as much as 9.4 lbs acting to center the inertia mass 150 relative to the shaft 134.

For a typical off-road bicycle application, with the inertial mass centered, the ratio of the velocity in zone 2 $V_2$ to the velocity in zone 3 $V_3$ (i.e., $V_2/V_3$) is desirably between 0.9 and 0.2. Preferably, the ratio of the velocity in zone 2 $V_2$ to the velocity in zone 3 $V_3$ is desirably between 0.8 and 0.35 and more preferably the ratio of the velocity in zone 2 $V_2$ to the velocity in zone 3 $V_3$ is desirably between 0.75 and 0.5.

The ratio of the gap G between the shaft 134 and the inertia mass 150 in zone 3 $Z_3$ and in zone 2 $Z_2$ (i.e., $G_3/G_2$), as demonstrated by the calculations above, influences the magnitude of the self-centering force produced by the inertia mass 150. The ratio ($G_3/G_2$) is desirably less than one. If the ratio ($G_3/G_2$) is equal to one, then by definition there is no step 205 between zone 2 $Z_2$ and zone 3 $Z_3$.

Based on flow continuity from Zone 2 to Zone 3, the ratio of the velocity $V_2$ in Zone 2 to the velocity $V_3$ in Zone 3 ($V_2/V_3$) is equal to the ratio of the Gap $G_3$ at Zone 3 to the Gap $G_2$ at Zone 2 ($G_3/G_2$). In other words, based on flow continuity it follows that: ($G_3/G_2$)=($V_2/V_3$).

Thus, for a typical off-road bicycle application with the inertia mass centered, the ratio of the gap at Zone 3 to the gap at Zone 2 is desirable between 0.90 and 0.20. Preferably the ratio of the gap at Zone 3 to the gap at Zone 2 is desirably between 0.80 and 0.35 and more preferably the ratio of the gap at Zone 3 to the gap at Zone 2 is desirably between 0.75 and 0.50.

Advantageously, the self-centering inertia mass 150 is able to compensate for force differentials due to the manufacturing variations in the passage 148 size and position as well as transverse accelerations, all of which tend to push the inertia mass 150 off-center. This allows reliable, sensitive operation of the inertia valve assembly 140 while also permitting cost-effective manufacturing methods to be employed without compromising performance.

Although a fluid pressure in zone 1 $Z_1$ of 400 psi was used in the above example, the actual pressure may vary depending on the force exerted on the shock assembly 38. The upper pressure limit in zone 1 $Z_1$ is typically determined by the predetermined blow off pressure of the blow off valve 140. Desirably, for an off-road bicycle rear shock with a shaft diameter of ⅝ inches, the predetermined blow off pressure is approximately 400 psi. Preferably, the predetermined blow off pressure within zone 1 $Z_1$ is approximately 600 psi and more preferably is approximately 800 psi. These predetermined blow off pressures are provided in the context of an off-road bicycle rear shock application and may vary for other applications or vehicle types.

Figure 13:
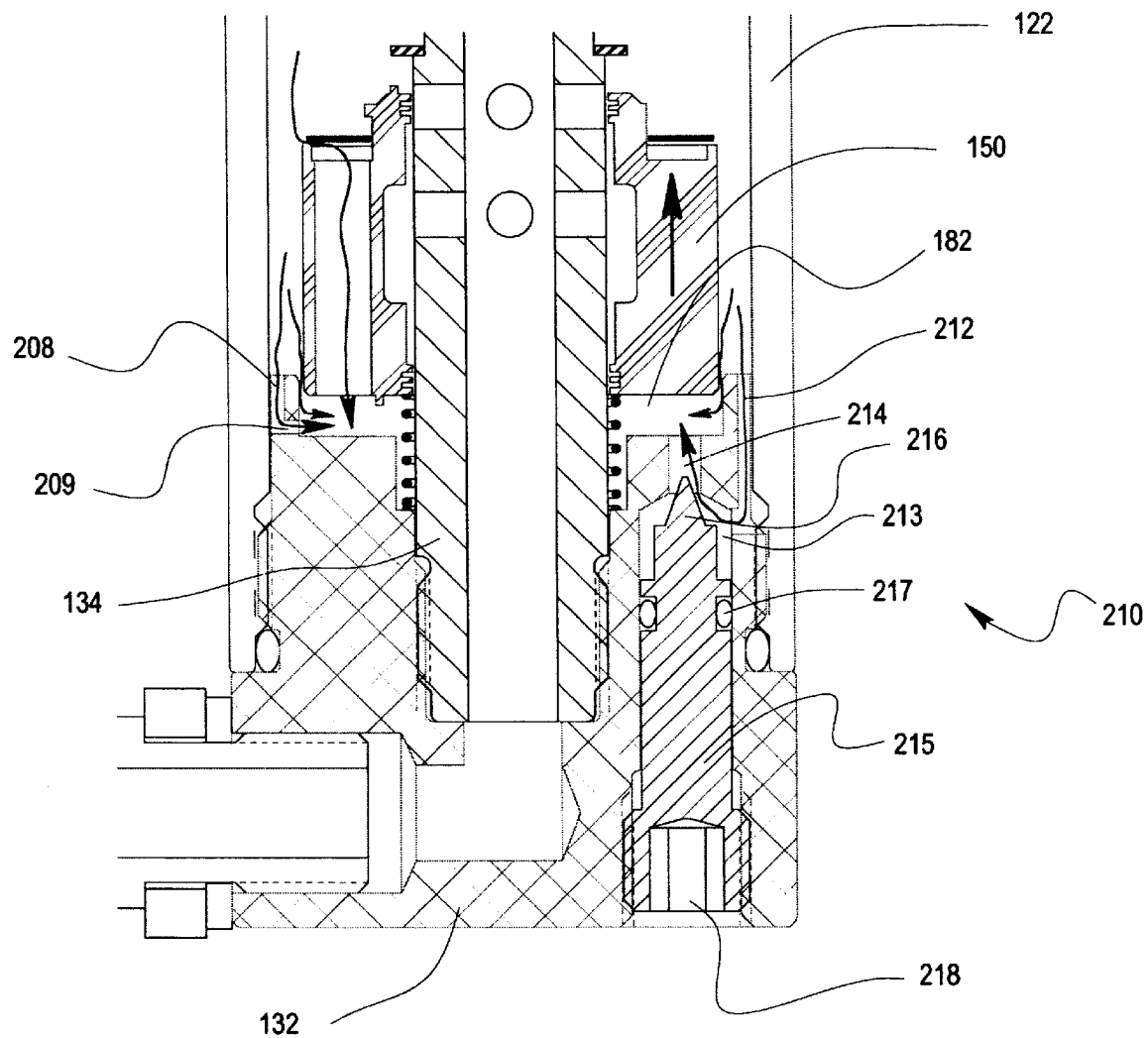
FIG. 13 is an enlarged view of an adjustable return fluid flow beneath the inertia mass.

FIG. 13 illustrates an alternative arrangement for controlling the refill rate, or timer function, of fluid flow into the pocket 182 as the inertia mass 150 moves in an upward direction away from its closed position. The end cap 132 includes a channel 208 communicating with an orifice 209 connecting the reservoir chamber 128 and the pocket 182. The orifice 209 permits fluid to flow between the reservoir chamber 128 and the pocket 182 in addition to the fluid flow through the clearance C and bleed flow between the check plate 190 and inertia mass 150. The size of the orifice 209 may be varied to influence the overall rate of fluid flow into the pocket 182.

FIG. 13 also illustrates an adjustable pocket refill arrangement 210. The adjustable refill arrangement 210 allows external adjustment of the refill rate of fluid flow into the pocket 182. The adjustable refill arrangement includes an inlet channel 212 connecting the reservoir chamber 128 to a valve seat chamber 213. An outlet channel 214 connects the valve seat chamber 213 to the pocket 182.

A needle 215 is positioned within the valve seat chamber 213 and includes a tapered end portion 216, which extends into the outlet channel 214 to restrict the flow of fluid therethrough. External threads of the needle 215 engage internal threads of the end cap 132 to allow the needle 215 to move relative to the outlet channel 216. The needle 215 includes a seal 217, preferably an O-ring, which creates a fluid tight seal between the needle 215 and the end cap 132. The exposed end of the needle 215 includes a hex-shaped cavity 218 for receiving a hex key to allow the needle 215 to be rotated. The exposed end of the needle 215 may alternatively include other suitable arrangements that permit the needle 215 to be rotated by a suitable tool, or by hand. For example, an adjustment knob may be connected to the needle 215 to allow a user to easily rotate the needle without the use of tools.

Rotation of the needle 215 results in corresponding translation of the needle 215 with respect to the end cap 132 (due to the threaded connection therebetween) and adjusts the position of the tapered end 216 relative to the outlet channel 214. If the needle 215 is moved inward, the tapered end 216 blocks a larger portion of the outlet channel 214 and slows the fluid flow rate into the pocket 182. If the needle 215 is moved outward, the tapered end 216 reduces its blockage of the outlet channel 214 and speeds the fluid flow rate into the pocket 182. This permits user adjustment of the refill rate of the pocket 182 and, accordingly, adjustment of the period of time the inertia mass 150 is held in an open position. Advantageously, the adjustable refill arrangement 210 allows a user to alter the period of time the inertia valve 138 is open and thus, the period of lowered compression damping once the inertia valve 138 is opened.

Figure 14:
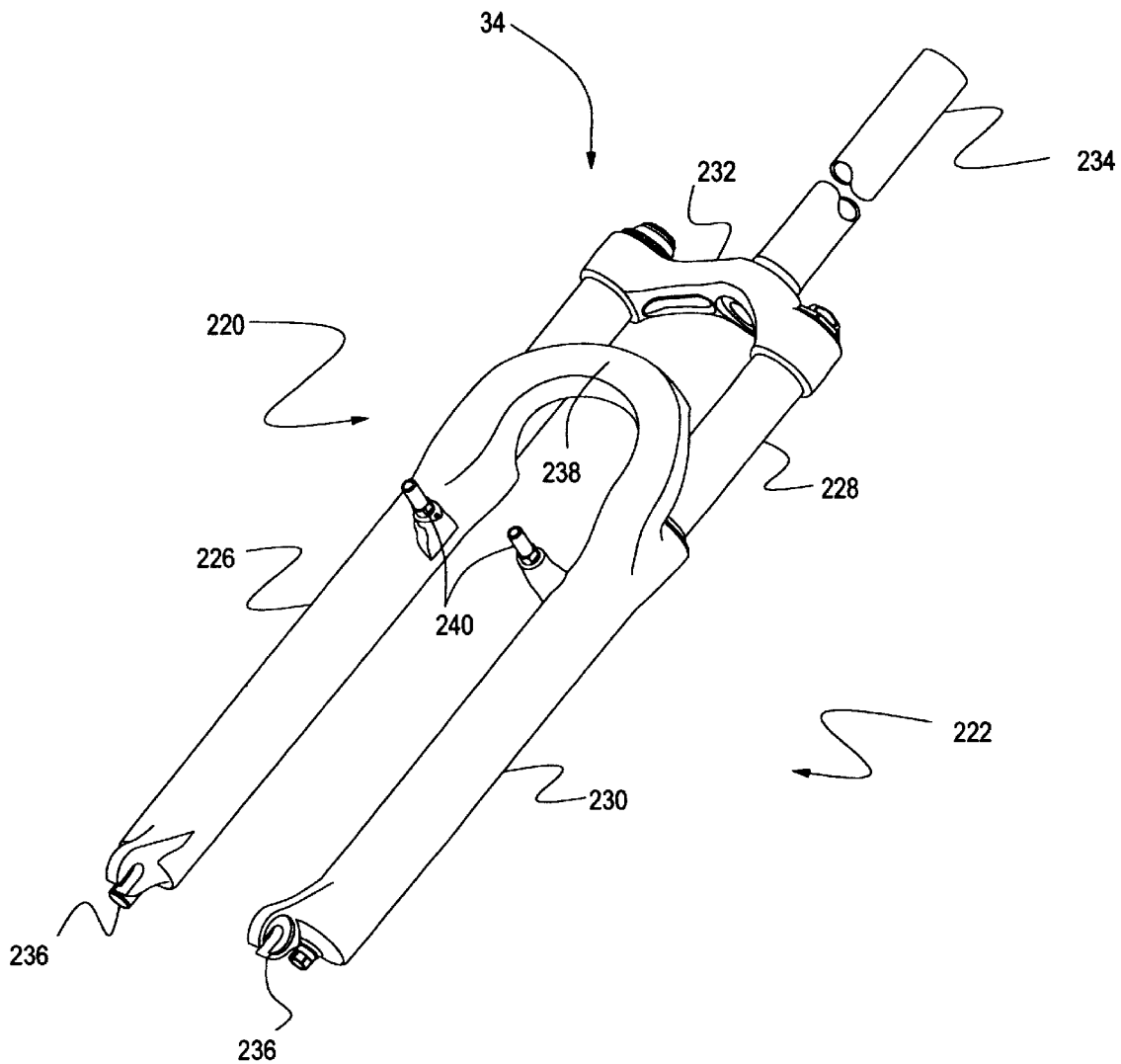
FIG. 14 is the front shock absorber, or suspension fork, of FIG. 1 as detached from the bicycle.

FIG. 14 illustrates the suspension fork 34 detached from the bicycle 20 of FIG. 1. The suspension fork 34 includes right and left legs 220, 222, as referenced by a person in a riding position on the bicycle 20. The right leg 220 includes a right upper tube 224 telescoping received in a right lower tube 226. Similarly, the left leg 222 includes a left upper tube 228 telescopingly received in a left lower tube 230. A crown 232 connects the right upper tube 224 to the left upper tube 228 thereby connecting the right leg 220 to the left leg 222 of the suspension fork 34. In addition, the crown 232 supports a steerer tube 234, which passes through, and is rotatably supported by the frame 22 of the bicycle 20. The steerer tube 234 provides a means for connection of the handlebar assembly 36 to the suspension fork 34, as illustrated in FIG. 1.

Each of the right lower tube 226 and the left lower tube 230 includes a dropout 236 for connecting the front wheel 28 to the fork 34. An arch 238 connects the right lower tube 226 and the left lower tube 230 to provide strength and minimize twisting of the tubes 226, 230. Preferably, the right lower tube 226, left lower tube 230, and the arch 238 are formed as a unitary piece, however, the tubes 226, 230 and the arch 238 may be separate pieces and connected by a suitable fastening method.

The suspension fork 34 also includes a pair of rim brake bosses 240 to which a standard rim brake assembly may be mounted. In addition, the fork 34 may include a pair of disc brake bosses (not shown) to which a disc brake may be mounted. Of course, the suspension fork 34 may include only one or the other of the rim brake bosses 240 and disc brake bosses, depending on the type of brake systems desired.

Figure 15:
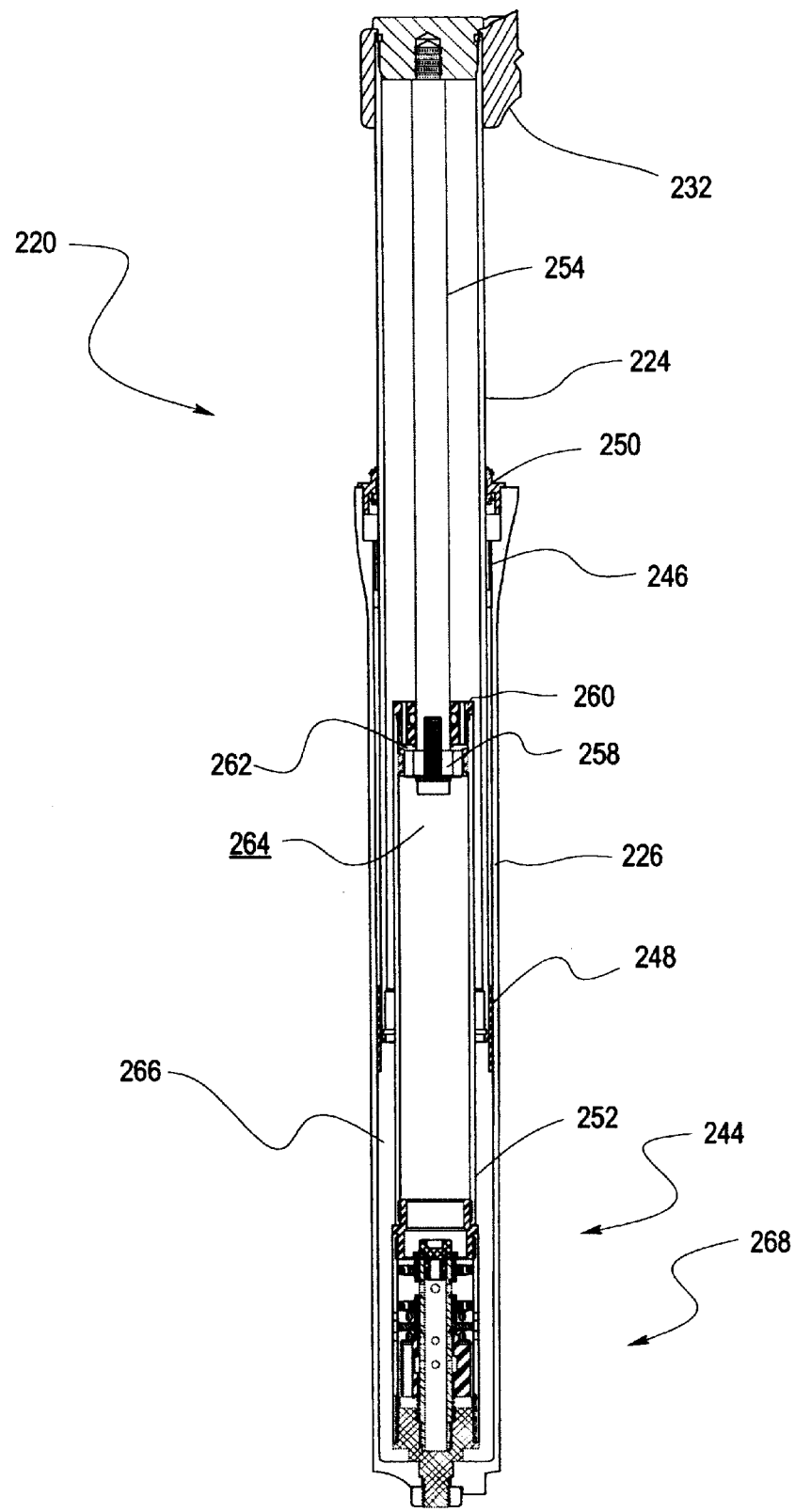
FIG. 15 is a cross-section view of the right leg of the fork of FIG. 14, illustrating various internal components.

FIG. 15 is a cross-section view of the right leg 220 of the suspension fork 34 having the front portion cutaway to illustrate the internal components of a damping assembly 244 of the fork 34. Preferably, the left leg 222 of the suspension fork 34 houses any of a known suitable suspension spring assembly. For example, an air spring or coil spring arrangement may be used. In addition, a portion of the suspension spring assembly may be housed within the right fork leg 220 along with the damper assembly 244.

As described previously, the upper tube 224 is capable of telescopic motion relative to the lower tube 226. The fork leg 220 includes an upper bushing 246 and a lower bushing 248 positioned between the upper tube 224 and the lower tube 226. The bushings 246, 248 inhibit wear of the upper tube 224 and the lower tube 226 by preventing direct contact between the tubes 224, 226. Preferably, the bushings 246, 248 are affixed to the lower tube 226 and are made from a self-lubricating and wear-resistant material, as is known in the art. However, the bushings 246, 248 may be similarly affixed to the upper tube 224. Preferably, the bushings 246, 248 include grooves (not shown) that allow a small amount of hydraulic fluid to pass between the bushings 246, 248 and the upper fork tube 224 to permit lubrication of the bushing 246 and seal, described below.

The lower tube 226 has a closed lower end and an open upper end. The upper tube 224 is received into the lower tube 226 through its open upper end. A seal 250 is provided at the location where the upper 224 enters the open end of the lower tube 226 and is preferably supported by the lower tube 226 and in sealing engagement with the upper tube 224 to substantially prevent oil from exiting, or a foreign material from entering the fork leg 220.

The damping assembly 244 is operable to provide a damping force in both compression and a rebound direction to slow both compression and rebound motion of the fork 34. The damper assembly 244 is preferably an open bath, cartridge-type damper assembly having a cartridge tube 252 fixed with respect to the closed end of the lower tube 226 and extending vertically upward. A damper shaft 254 extends vertically downward from a closed upper end of the upper tube 224 and supports a piston 258. Thus, the piston 258 is fixed for movement with the upper tube 224 while the cartridge tube 252 is fixed for movement with the lower tube 226.

The piston 258 is positioned within the cartridge tube 252 and is in telescoping engagement with the inner surface of the cartridge tube 252. A cartridge tube cap 260 closes the upper end of the cartridge tube 252 and is sealing engagement with the damper shaft 254. Thus, the cartridge tube 252 defines a substantially sealed internal chamber which contains the piston 258.

The piston 258 divides the internal chamber of the cartridge tube 252 into a variable volume rebound chamber 262 and a variable volume compression chamber 264. The rebound chamber 262 is positioned above the piston 258 and the compression chamber 264 is positioned below the piston 258. A reservoir 266 is defined between the outer surface of the cartridge tube 252 and the inner surfaces of the upper and lower tubes 224, 226. A base valve assembly 268 is operably positioned between the compression chamber 264 and the reservoir 266 and allows selective communication therebetween.

Figure 16:
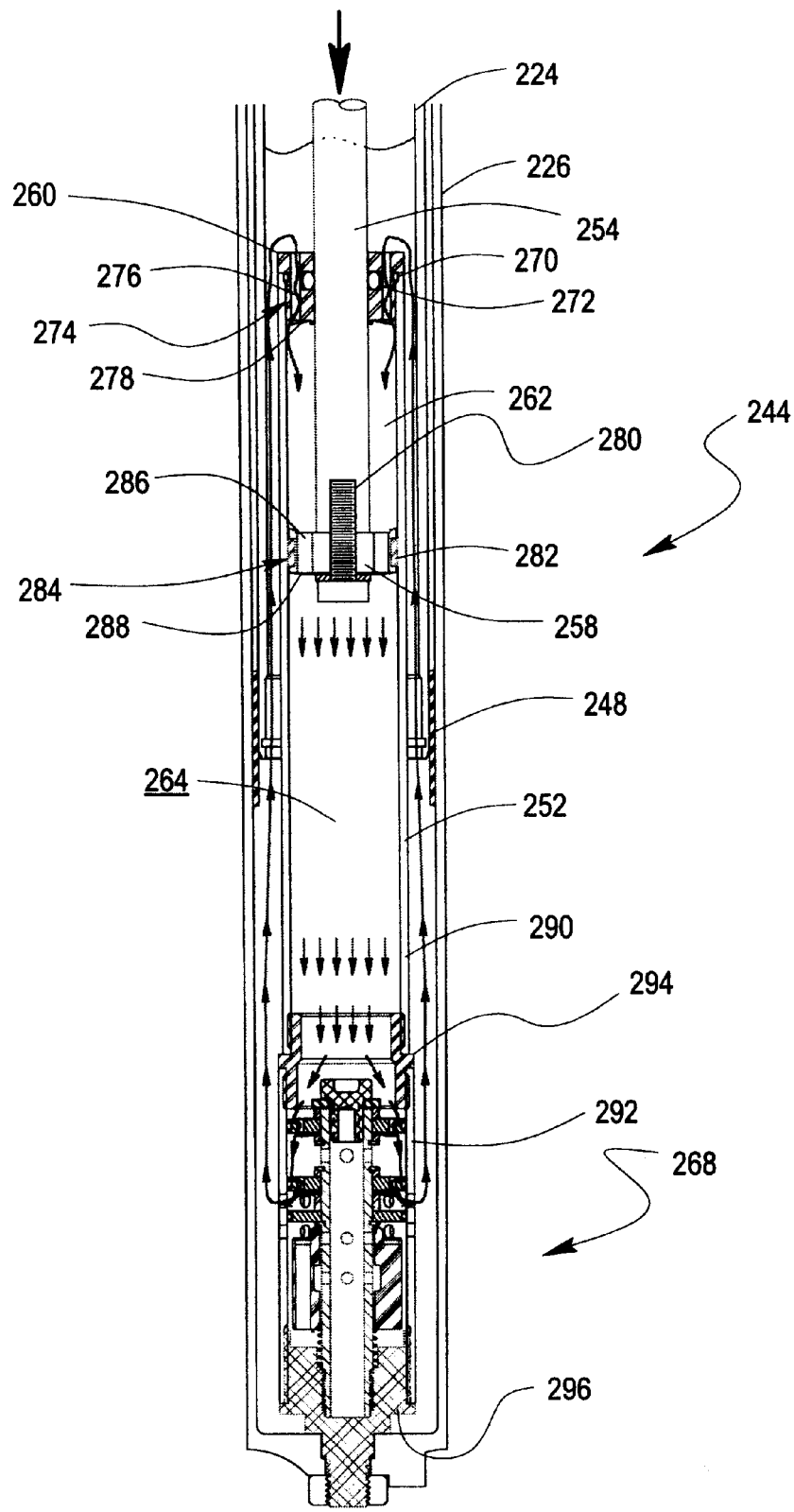
FIG. 16 is an enlarged cross-section of a lower portion of the fork leg of FIG. 15, illustrating an inertia valve damping system.

FIG. 16 is an enlarged cross section of the damping assembly 244. As described above, a cartridge tube cap 260 closes the upper end of the cartridge tube 252. An outer seal 270 creates a seal between the cartridge tube cap 260 and the cartridge tube 252 while an inner seal 272 creates a seal between the cartridge tube cap 260 and the damper shaft 254. Accordingly, extension and retraction of the damper shaft 254 with respect to the cartridge tube 252 is permitted while maintaining the rebound chamber 262 in a substantially sealed condition.

The cartridge cap 260 includes a one-way refill valve 274 which, during inward motion of the damper shaft 254 with respect to the cartridge tube 252, allows fluid flow from the reservoir 266 into the rebound chamber 262. The refill valve 274 comprises one or more axial passages 276 through the cap 260 which are closed at their lower end by refill shim stack 278. Thus, the shim stack 278 allows fluid flow from the reservoir 266 to the rebound chamber 262 with a relatively small amount of resistance. When the fluid pressure in the rebound chamber 262 is greater than the fluid pressure in the reservoir 266, such as during retraction of the damper shaft 254, the refill shim stack 278 engages the lower surface of the cartridge tube cap 260 to substantially seal the refill passages 276 and prevent fluid from flowing therethrough.

The piston 258 is fixed to the end of the damper shaft 254 by a threaded fastener 280. The piston includes an outer seal 282 which engages the inner surface of the cartridge tube 252 to provide a sealing engagement between the piston 258 and the inner surface of the cartridge tube 252. Thus, fluid flow around the piston is substantially eliminated.

The piston 258 includes a one-way rebound valve assembly 284 which permits fluid flow from the rebound chamber 262 to the compression chamber 264 while preventing flow from the compression chamber 264 to the rebound chamber 262. The rebound valve assembly 284 comprises one or more axial passages 286 through the piston 258 closed at their lower end by a rebound shim stack 288. Fluid is able to flow from the rebound chamber 262 through the passages 286 and into the compression chamber 264 against the resistance offered by the shim stack 288. When the pressure is greater in the compression chamber 264 than in the rebound chamber 262, the shim stack 288 engages the lower surface of the piston 258 to substantially seal the passages 286 and prevent the flow of fluid therethrough.

In the illustrated embodiment, the cartridge tube 252 is split into an upper portion 290 and a lower portion 292, which are each threadably engaged with a connector 294 to form the cartridge tube 252. Optionally, a one-piece cartridge tube may be employed. A base member 296 is fixed to the closed end of the lower tube 226 and supports the cartridge 252. The lower portion 292 of the cartridge tube 252 is threadably engaged with the base member 296.

Figure 17:
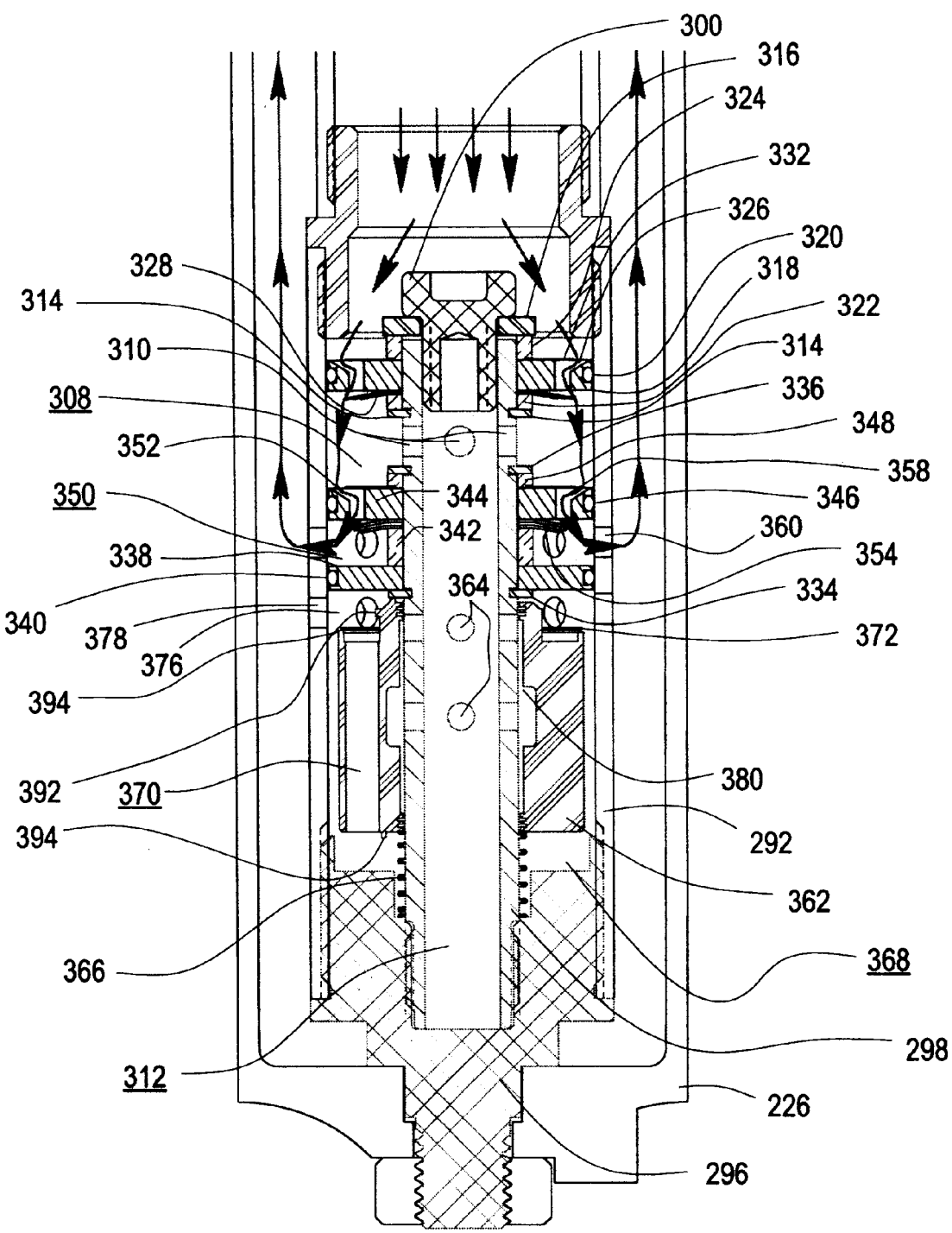
FIG. 17 is an enlarged cross-section of a base valve assembly of the lower portion of the fork leg of FIG. 16.

FIG. 17 is an enlarged cross-sectional view of the base valve assembly 268. The base valve assembly 268 is housed within the lower portion 292 of the cartridge tube 252 and is supported by a shaft 298 which extends in an upward direction from the base member 296. The entire base valve assembly 268 is secured onto the shaft 298 by a bolt 300 which threadably engages the upper end of the shaft 298.

The base valve assembly 268 includes a compression valve 302, a blowoff valve 304, and an inertia valve 306. The compression valve 302 is positioned on the upper portion of the shaft 298. The blowoff valve 304 is positioned below the compression valve 302 and spaced therefrom. The compression valve 302 and the blowoff valve 304 define a blowoff chamber 308 therebetween. A plurality of passages 310 connect the blowoff chamber 308 to a central passage 312 of the base valve shaft 298.

A snap ring 314, which is held in an annular recess of the shaft 298, supports the compression valve 302. A washer 316 positioned underneath the bolt 300 holds the compression valve 302 onto the shaft 298. The compression valve 302 includes a compression piston 318 sealingly engaged with the inner surface of the lower portion 292 of the cartridge tube 252 by a seal 320. The compression piston 318 is spaced from both the snap ring 314 and the washer 316 by a pair of spacers 322, 324 respectively.

The compression piston 318 includes one or more compression passages 326 covered by a compression shim stack 328. The compression shim stack 328 is secured to the lower surface of the compression piston 318 by the lower spacer 322. The compression shim stack 328 deflects about the lower spacer 322 to selectively open the compression passages 326. The compression shim stack 328 seals against the lower surface of the compression piston 318 to prevent unrestricted compression flow past the compression shim stack 328.

Figure 20:
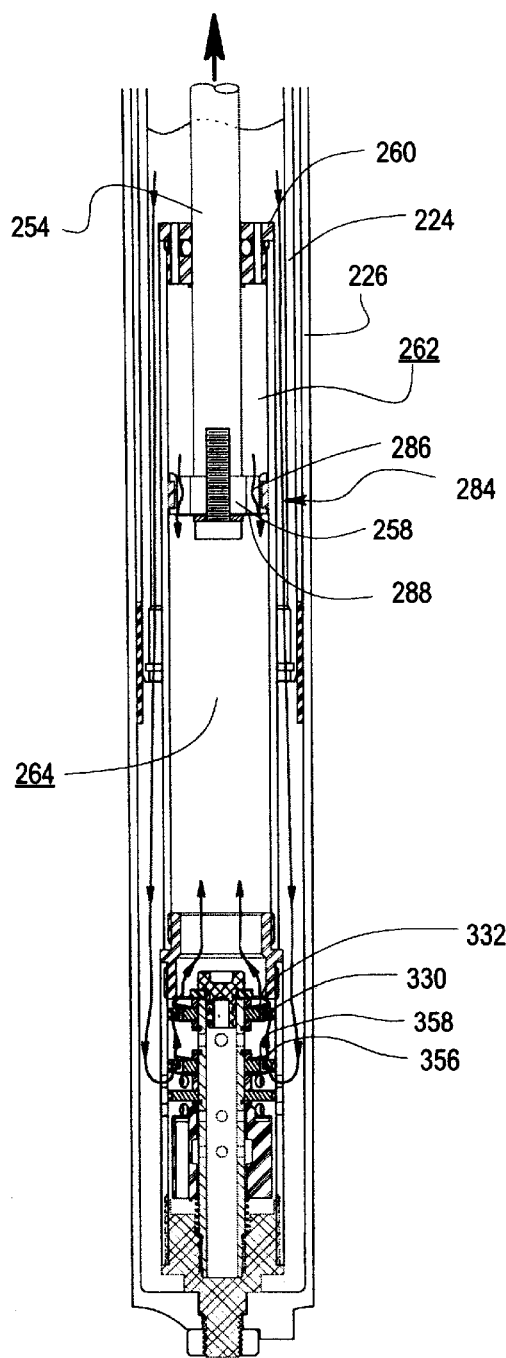
FIG. 20 is a cross-section view of the lower portion of the fork of FIG. 16 illustrating rebound fluid flow.
Figure 21:
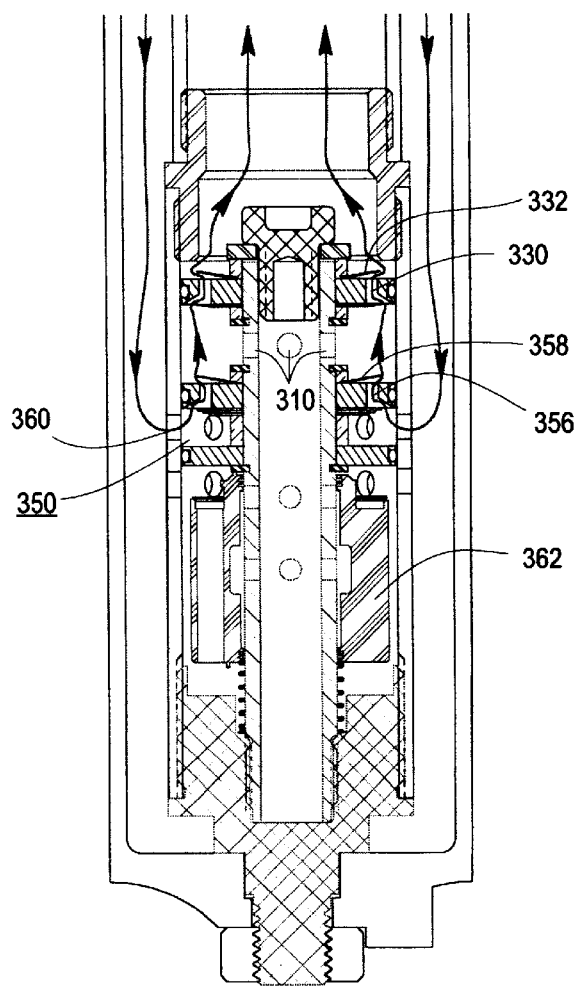
FIG. 21 is the base valve assembly of FIG. 17 illustrating rebound fluid flow.

As illustrated in FIGS. 20 and 21, which show fluid flows during the rebound stroke, the compression piston 318 also includes one or more refill passages 330 extending axially through the compression piston 318. The refill passages 330 are covered at the upper surface of the compression piston 318 by a refill shim stack 332. The refill shim stack 332 is held against the upper surface of the compression piston 318 by the upper spacer 324 and deflects to open the refill passages 330. Thus, the refill shims 332 prevent fluid flow through the refill passages from the compression chamber 264 to the blowoff chamber 308, but permit fluid flow from the blowoff chamber 308 through the refill passages 330 and into the compression chamber 264 against the slight resistance offered by the refill shim stack 332.

As illustrated in FIG. 17, the blowoff valve 304 is positioned between a lower snap ring 334 and an upper snap ring 336. A separator plate 338 is supported by the lower snap ring 334 and is sealingly engaged with the inner surface of the lower portion 292 of the cartridge tube 252 by a seal 340. A lower spacer 342 spaces the blowoff piston 344 in an upward direction from the separator plate 338. The blowoff piston 344 is also sealingly engaged with the inner surface of the lower portion 292 of the cartridge tube 252 by a seal 346. An upper spacer 348 spaces the blowoff piston 344 from the upper snap ring 336. A separator chamber 350 is defined between the blowoff piston 344 and the separator plate 338.

As illustrated in FIGS. 20 and 21, the blowoff piston 344 includes one or more blowoff passages 352 covered on the lower surface of the blowoff piston 344 by a blowoff shim stack 354. The blowoff shim stack 354 is positioned between the blowoff piston 344 and the lower spacer 342 to allow fluid flow from the blowoff chamber 308 into the separator chamber 350 at pressures above a predetermined threshold. The blowoff shim stack 354 seals passages 352 to prevent unrestricted (without blowoff) compression fluid flow from the blowoff chamber 308 to the separator chamber 350.

The blowoff piston 344 also includes one or more refill passages 356 covered at the upper surface of the blowoff piston 344 by a refill shim stack 358. The refill shim stack 358 is held against the upper surface of the blowoff piston 344 by the upper spacer 348 to seal the refill passages 356 and prevent fluid flow from the blowoff chamber 308 into the separator chamber 350. However, the refill shims deflect about the upper spacer 348 to allow fluid flow from the separator chamber 350 into the blowoff chamber 308 through the refill passages 356 with relatively little resistance. One or more passages 360 are formed within the lower portion 292 of the cartridge tube 252 at a height between the separator plate 338 and the blowoff piston 344 to allow fluid communication between the separator chamber 350 and the reservoir 266.

Preferably, the inertia valve 306 is substantially identical to the inertia valve previously described in relation to the shock absorber 38. The inertia valve 306 includes an inertia mass 362 movable between a closed position, where the inertia mass 362 closes two or more passages 364, and an open position, where the inertia mass 362 uncovers the two or more passages 364. The uppermost or closed position of the inertia mass 362 is defined by the snap ring 334, which supports the separator plate 338.

The inertia mass 362 is biased into its closed position by a spring 366. The lowermost or open position of the inertia mass 362 is defined when the lower surface of the inertia mass 362 engages the lower interior surface of a pocket 368, defined by the base member 296. The inertia mass 362 includes one or more axial passages 370 covered at the upper surface of the inertia mass 362 by a check plate 372 which is movable between a substantially closed position against the standoff feet 394 at the upper surface of the inertia mass 362 and an open position against the stop projections 392 on the upper, necked portion of the inertia mass 362.

The check plate 372 moves into an open position when the inertia mass 362 moves downward in relation to the base valve shaft 298 to allow fluid to flow from the pocket 368 into an inertia valve chamber 376 above the inertia mass 362 through the passages 370. The check plate 372 moves into a substantially closed position upon upward movement of the inertia mass 362 relative to the base valve shaft 298 to restrict fluid flow through the passages 370. One or more passages 378 are defined by the lower portion 292 of the cartridge tube 252 to allow fluid communication between the inertia valve chamber 376 and the reservoir 266.

An annular clearance C is defined between the inertia mass 362 and the pocket 368 when the inertia mass 362 is in its open position. In a similar manner to the inertia valve described in relation to the shock absorber 38, the clearance C restricts fluid flow from the inertia valve chamber 376 into the pocket 368. The inertia valve 306 preferably includes other features described in relation to the inertia valve of the shock absorber 38. For example, the inertia mass 362 preferably includes a plurality of standoff feet 394 at the locations discussed above in relation to the inertia mass of the shock absorber 38. Additionally, the inertia mass 362 includes an annular recess 380 aligned with the passages 364 when the inertia mass 362 is in its closed position. The inertia mass 362 also includes a step preferably on each end of the interior surface of the inertia mass 362 which is sliding engagement with the base valve shaft 298, as described above. As shown, the inertia mass 362 also includes a labyrinth seal arrangement substantially as described above.

When the front wheel 28 of the bicycle 20 of FIG. 1 encounters a bump, a force is exerted on the fork 34, which tends to compress the fork legs 224, 226 in relation to each other. If the upward acceleration of the lower fork tube 226 along its longitudinal axis (i.e., the axis of travel of the inertia mass 362) is below a predetermined threshold, the inertia mass 362 remains in its closed position. Pressure within the compression chamber 264 causes fluid to flow through the compression passages 326 and into the blowoff chamber 308. If the pressure within the blowoff chamber 308 is below a predetermined threshold, the blowoff shims 354 remain closed and the suspension fork 34 remains substantially rigid.

If the pressure within the blowoff chamber 308 exceeds the predetermined threshold, the blowoff shim stack 354 deflects away from the blowoff piston 344 to allow fluid to flow through the blowoff passage 352 into the separator chamber 350 and into the reservoir through the passages 360, as illustrated in FIG. 17. Thus, the fork 34 is able to compress with the compression damping rate being determined primarily by the shim stack 354 of the blowoff piston 344.

As the upper fork leg 224 moves downward with respect to the lower fork leg 226, and thus the piston 258 and damper shaft 254 move downward with respect to the cartridge 252, fluid is drawn into the rebound chamber 262 through the refill valve 274, as illustrated in FIG. 16.

When the upward acceleration of the lower fork leg 226 exceeds a predetermined threshold, the inertia mass 362 tends to stay at rest and overcomes the biasing force of the spring 366 to open the passages 364. Thus, fluid flow is permitted from the central passage 312 of the base valve shaft 298 into the inertia chamber 376 through the passages 364 and from the inertia chamber 376 into the reservoir 266 through the passages 378, as illustrated in FIGS. 18 and 19. Accordingly, at pressures lower than the predetermined blowoff pressure, when the inertia mass 362 is open (down) fluid is permitted to flow from the compression chamber 264 to the reservoir 266 and the suspension fork 244 is able to compress.

Upon rebound motion of the suspension fork 34, the refill valve 274 closes and the fluid within the rebound chamber 262 is forced through the rebound passages 286 of the piston 258 against the resistive force of the rebound shim stack 288, as illustrated in FIG. 20. A volume of fluid equal to the displaced volume of the damper shaft 254 is drawn into the compression chamber 264 from the reservoir chamber 266 via the passages 356 and 330 against the slight resistance offered by the refill shims 358 and 332, as illustrated in FIG. 21.

FIGS. 22–25 illustrate an alternative embodiment of the suspension fork 34. The embodiment of FIGS. 22–25 oper-
ates in a substantially similar manner as the suspension fork 34 described in relation to FIGS. 14–21 with the exception that the embodiment of FIGS. 22–25 allows flow through a compression valve 382 in the piston 258 during compression motion. This is known as a shaft-displacement type damper, because a volume of fluid equal to the displaced volume of the shaft 254 is displaced to the reservoir 266 during compression motion of the fork 34. For reference, this compares with the previously-described embodiment where the displaced fluid volume equals the displaced volume of the full diameter of the piston 258. Flow through the piston 258 into the rebound chamber during compression eliminates the need for refill passages in the cartridge cap, and thus a solid cap 260 is utilized.

The compression valve 382 is a one-way valve, similar in construction to the one-way valves described above. The compression valve 382 comprises one or more valve passages 384 formed axially in the piston 258 and a shim stack 386 closing the valve passages 384. As is known, the shim stack 386 may comprise one or more shims. The shims may be combined to provide a desired spring rate of the shim stack 386. The shim stack 386 is deflected to allow fluid flow between the compression chamber 264 and the rebound chamber 262 during compression of the suspension fork 34. Preferably, shim stack 386 is significantly "softer" than shim stack 328 in the base valve assembly 268, in order to ensure sufficient pressure for upward flow through piston 258 into rebound chamber 262 during compression strokes.

Figure 24:
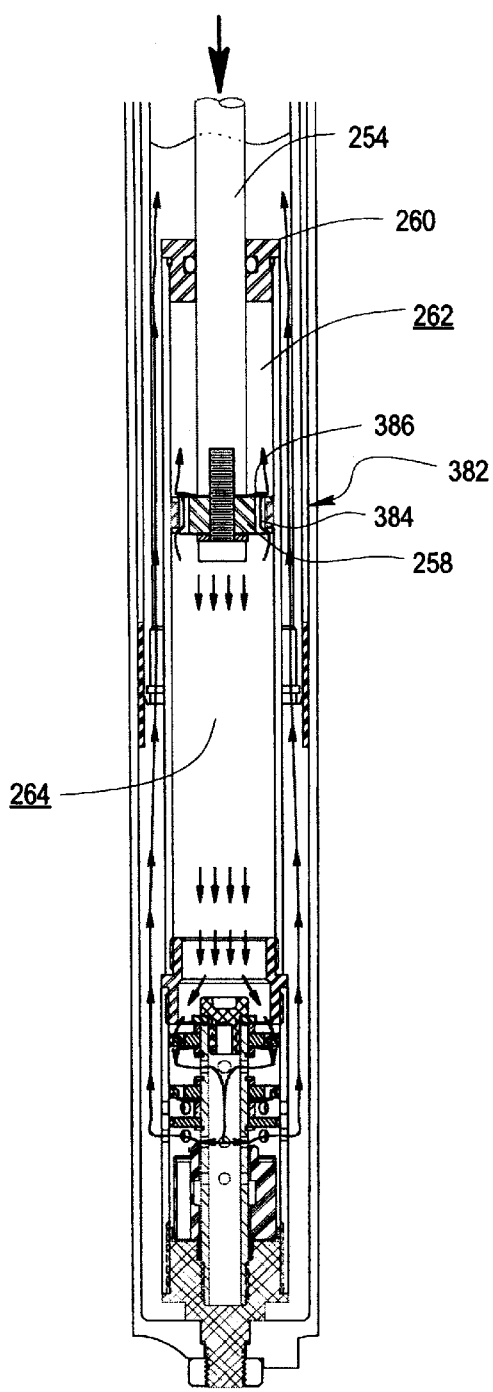
FIG. 24 is the lower portion of the fork of FIG. 22, with the inertia valve in an open position.
Figure 25:
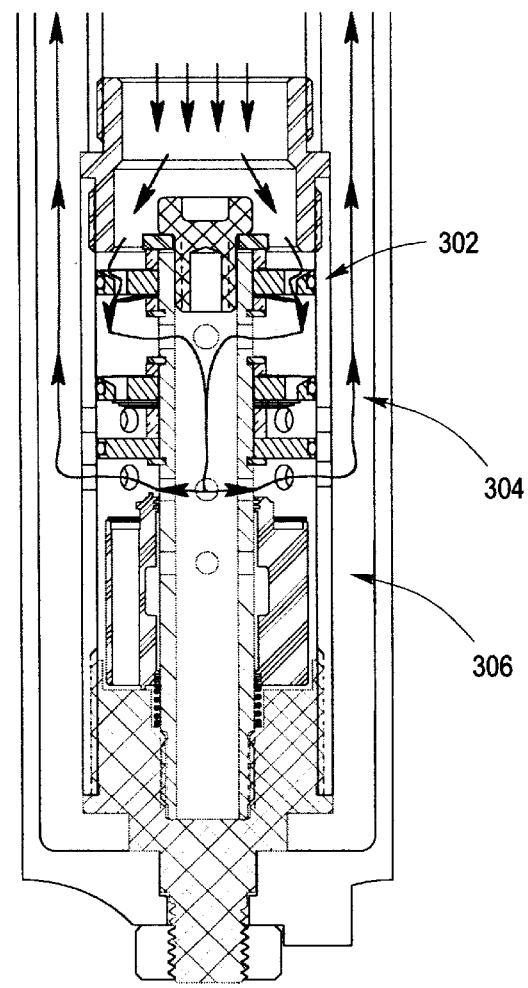
FIG. 25 is the base valve assembly of FIG. 23, with the inertia valve in an open position.

The operation of the suspension fork 34 of FIGS. 22–25 is substantially similar to the operation of the suspension fork 34 described in relation to FIGS. 14–21. However, during compression motion of the fork 34 of FIGS. 22–25, fluid flows from the compression chamber 264 to the rebound chamber 262. This results in less fluid being displaced into the reservoir 266 than in the previous embodiment. As will be appreciated by one of skill in the art, FIGS. 22 and 23 illustrate compression fluid flow when the blow off valve 304 is open. FIGS. 24 and 25 illustrate compression fluid flow when the inertia valve 306 is open.

As will be appreciated by one of ordinary skill, the illustrated suspension fork and rear shock absorber arrangements advantageously minimize unintended movement of the inertia mass 150 due to normal compression and rebound fluid flow. With particular reference to FIG. 3b, compression fluid flow (illustrated by the arrow in FIG. 3b) through the blow off valve 140 of the rear shock absorber 38 occurs through the passage 136 of the reservoir shaft 134 as it passes the inertia mass 150. Accordingly, fluid moving with any substantial velocity does not directly contact the inertia mass 150, thereby avoiding undesired movement of the inertia mass 150 due to forces from such a flow. Similarly, compression fluid flow through the passages 148 when the inertia mass 150 is in an open position (FIG. 5) and refill fluid flow upon rebound of the shock absorber 38 are similarly insulated from the inertia mass 150. With reference to FIGS. 17, 19 and 21, the inertia mass 150 is also insulated from contact with moving fluid in the suspension fork 34. FIGS. 23 and 25 illustrate similar flow paths for the second embodiment of the suspension fork 34.

Figure 26:
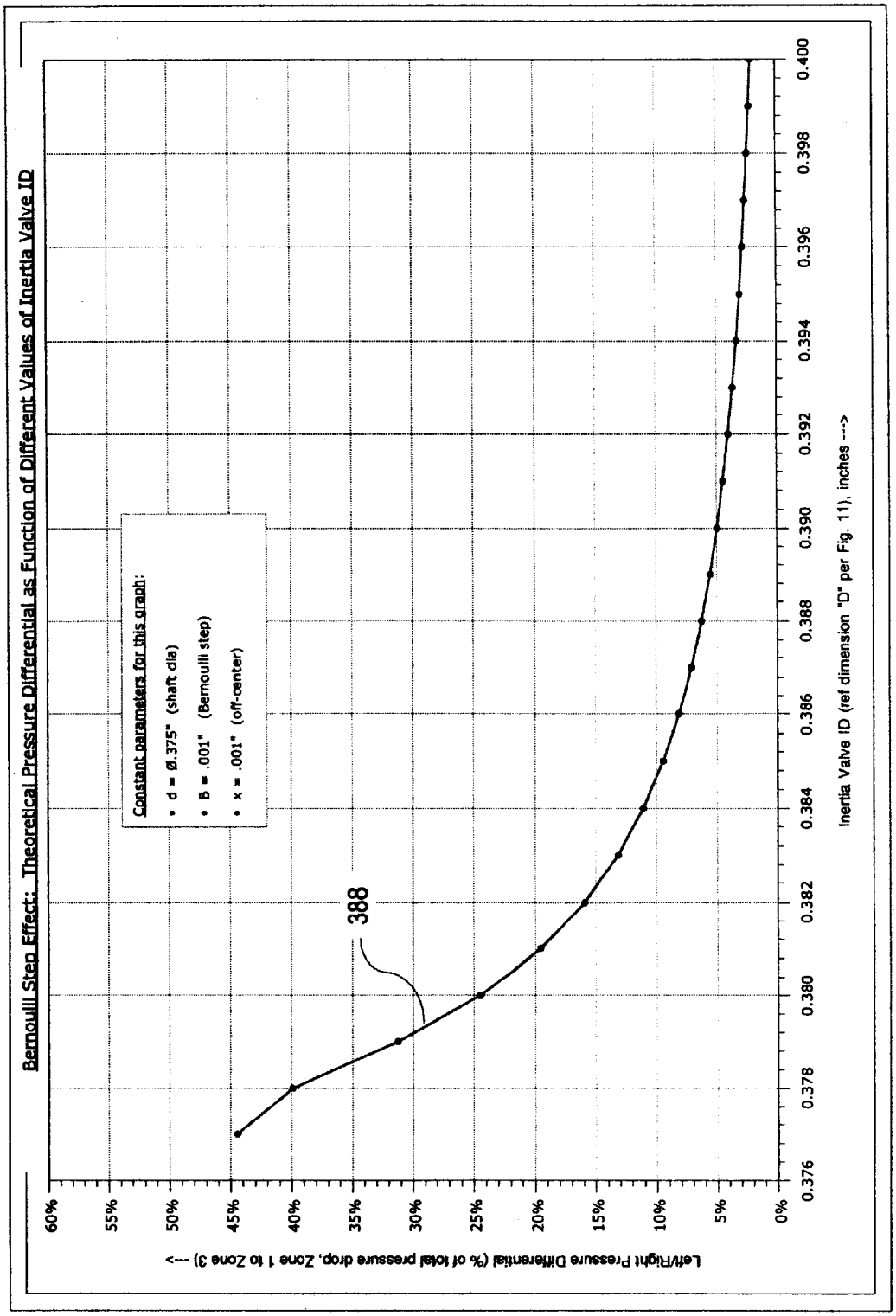
FIG. 26 is a graph of the pressure differential of fluid acting on the left and right sides of the inertia mass versus internal diameter of the inertia mass.

FIG. 26 is a graph illustrating the influence of a change in the internal diameter D of a specific inertia mass 150 on the pressure differential between the right and left side when the inertia mass 150 is off-center by a distance x of 0.001 inches. As described above in relation to FIGS. 11 and 12, the reservoir shaft 134, which defines an axis of motion for the inertia mass 150, has a diameter referred to by the reference character "d." The reference character "B" refers to the size of the step 205, or the difference in the radial dimensions of the inner surface of the inertia mass 150 between zone 2 $Z_2$ and zone 3 $Z_3$. For the purposes of illustration in the graph of FIG. 26, the diameter d of the shaft 134 is given a value of 0.375 inches. The step size B is given a value of 0.001 inches.

In the graph of FIG. 26, the value of the minimum internal diameter of the inertia mass 150 (i.e., the diameter at zone 3 $Z_3$) is varied and the corresponding pressure differential between the left and right sides is illustrated by the line 388, given the constants d, B and x. As described above, the self-centering force is proportional to the pressure differential produced by the design of zones 1, 2 and 3 of the self-centering inertia mass 150. Thus, as the pressure differential increases, so does the ability of the inertia mass 150 to center itself with respect to the shaft 134. As illustrated, the value of the pressure differential between the left and right sides varies greatly with relatively small changes in the internal diameter D of the inertia mass 150. The pressure differential is at its maximum value on the graph when the difference between the inertia valve diameter D and the shaft diameter d is small. The pressure differential diminishes as the difference between the inertia valve diameter D and the shaft diameter d increases.

For example, when the inertia valve diameter D is equal to 0.400 inches, the pressure differential is equal to approximately 8 psi. With the inertia valve diameter D equal to 0.400 inches and the shaft diameter d equal to 0.375 inches, the total gap at zone 3 $G_3$ for both the left and right sides is equal to 0.025 inches (0.400–0.375), when the inertia mass 150 is centered. Accordingly, each gap at zone 3 for the left and right side, $G_{3L}$ and $G_{3R}$ is equal to 0.0125 inches (0.025/2), when the inertia mass 150 is centered (FIG. 11).

The pressure differential has substantially increased at a point when the inertia valve diameter D is equal to 0.385. At this point, the resulting pressure differential is approximately 38 psi. Following the calculation above, each gap at zone 3 for the left and right side, $G_{3L}$ and $G_{3R}$ is equal to 0.005 inches, with a centered inertia mass 150.

The pressure differential has again substantially increased, to approximately 78 psi, at a point when the inertia valve diameter D is equal to 0.381 inches. When the inertia diameter D is equal to 0.381 inches, each gap at zone 3 for the left and right side, $G_{3L}$ and $G_{3R}$, is equal to 0.003 inches, assuming the inertia mass 150 is centered about the shaft 134. At a point when the inertia valve diameter D is equal to 0.379, the pressure differential has increased significantly to approximately 125 psi. At this point, the gap at zone 3 for the left and right side, $G_{3L}$ and $G_{3R}$, is 0.002 inches.

The illustrated pressure differential reaches a maximum when the inertia valve diameter D is equal to 0.377 inches. At this value of D, the pressure differential is approximately 180 psi and each gap at zone 3 for the left and right side, $G_{3L}$ and $G_{3R}$, is equal to 0.001 inches, again assuming a centered inertia mass 150 and the values of d, B and x as given above. Although the gap at zone 3 $G_3$ may be reduced further, resulting in theoretically greater self-centering forces, a gap in zone 3 $G_3$ of at least 0.001 inches is preferred to allow the inertia mass 150 to move freely on the shaft 134. A gap G3 below this value may allow particulate matter within the damping fluid to become trapped between the inertia mass 150 and shaft 134, thereby inhibiting or preventing movement of the inertia mass 150.

Figure 27:
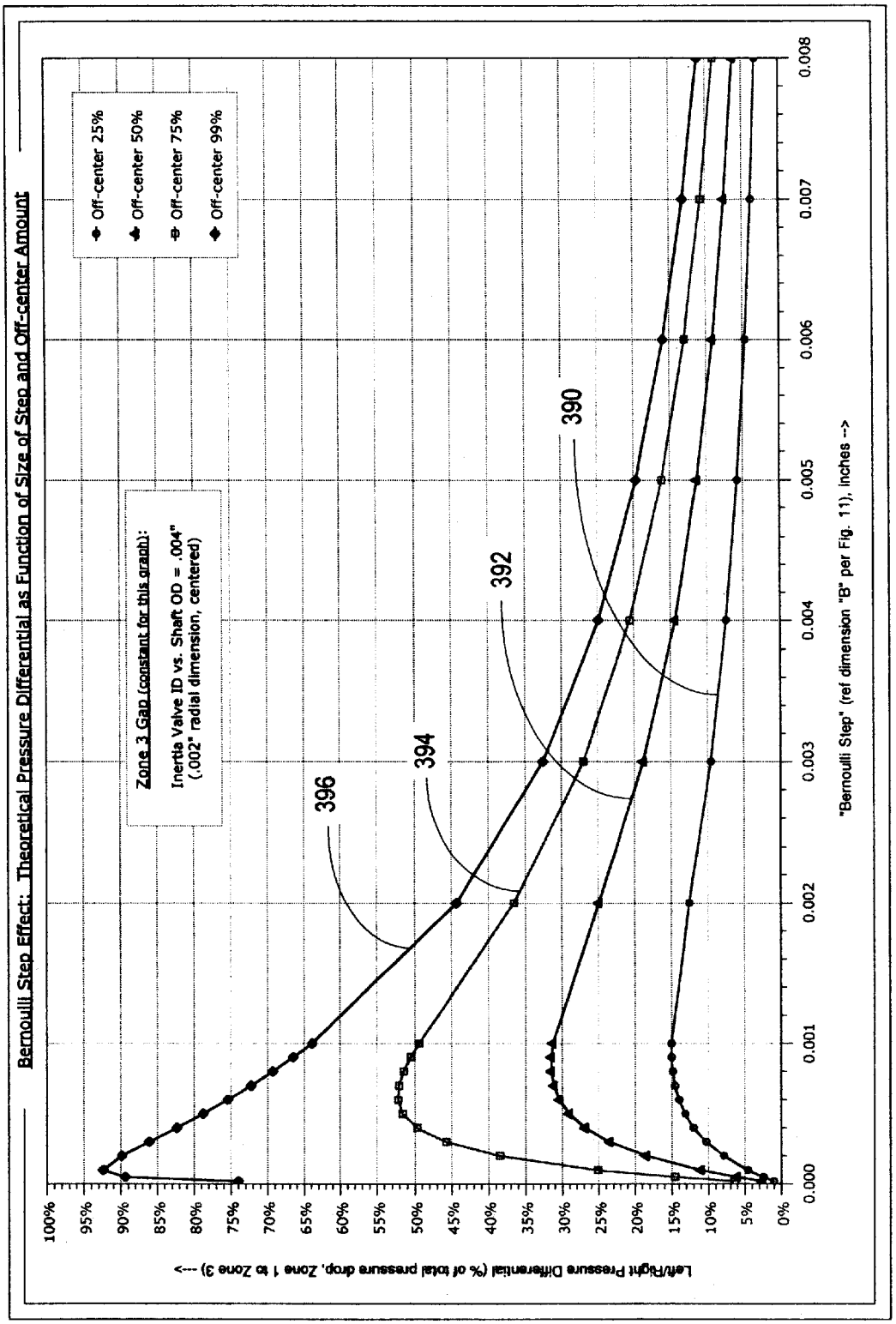
FIG. 27 is a graph of the pressure differential factor of fluid acting on the left and right sides of the inertia mass versus the internal diameter of the inertia mass for a radial gap between the inertia mass and shaft of 0.002 inches.

FIG. 27 is a graph illustrating the relationship between the size B of the "Bernoulli step" 205 and the resulting pressure differential percentage. A pressure differential of 0% indicates no pressure differential, and thus no self-centering force, is present (i.e., the pressure on the right and left sides of the inertia mass 150 are equal), while a pressure differential of 100% indicates a maximum pressure differential, and self-centering force, is present (i.e., zero pressure on one side of the inertia mass 150). The graph is based on a gap at zone 3 $G_3$ of 0.002 inches, with the inertia mass 150 centered. In other words, the inertia mass diameter D minus the shaft diameter d is equal to 0.004 inches, which results in a gap on each of the right and left sides, $G_{3R}$ and $G_{3L}$, of 0.002 inches.

The graph includes individual lines 390, 392, 394 and 396 representing different off-center values of the inertia valve. The values are given in terms of the percentage of the total gap $G_3$ (0.002" in FIG. 27) that the inertia mass 150 is off-center. For example, an off-center amount of 25% means that the center axis of the inertia mass 150 is offset 0.0005 inches to either the left or right from the center axis of the shaft 134. Similarly, an off-center amount of 50% means that the center axis of the inertia mass 150 is offset 0.001 inches from the center axis of the shaft 134. Line 390 represents an off-center amount of 25%, line 392 represents an off-center amount of 50%, line 394 represents an off-center amount of 75%, and line 396 represents an off-center amount of 99%.

The largest step size B illustrated on the graph of FIG. 27 is 0.008 inches. A step 205 of a larger size B may be provided, however, as indicated by the graphs, theoretical self-centering effects have diminished significantly at this point. Accordingly, the step size is desirably less than 0.008 inches, at least for off-road bicycle applications based on these theoretical calculations. The ratio between the gap at zone 3 $G_3$ and the gap at zone 2 $G_2$ (i.e., $G_3/G_2$) in this situation is 1/5, for a centered inertia mass 150 and a gap at zone 3 $G_3$ of 0.002 inches.

With continued reference to FIG. 27, lines 390–396 illustrate that the pressure differential has increased at a point when the step size B is equal to 0.006 inches in comparison to the pressure differential at a step size B of 0.008 inches. At this point, the ratio between the gap at zone 3 $G_3$ and the gap at zone 2 $G_2$ (i.e., $G_3/G_2$), for a centered inertia mass 150, is 1/4. As a result, the self-centering effect is more substantial for ratios which are greater than 1/4. The pressure differential again increases at a point when the step size B is equal to 0.004 inches. At this point, the ratio between the gap at zone 3 $G_3$ and the gap at zone 2 $G_2$ (i.e., $G_3/G_2$), for a centered inertia mass 150, is 1/3. As a result, the self-centering force for ratios above self-centering force 1/3 is increased over the self-centering force obtained with a larger step size B.

For at least a portion of the lines 390–396, the pressure differential again increases for step sizes B less than 0.003. At this point, the ratio of the gap at zone 3 $G_3$ to the gap at zone 2 $G_2$ (i.e., $G_3/G_2$), for a centered inertia mass 150, is 2/5. Accordingly, the self-centering effect is more substantial for ratios which are greater than 2/5. Furthermore, at least a portion of the lines 390–396 illustrate an increase in the pressure differential at a point when the step size B is equal to 0.002 inches. At this point, the ratio of the gap at zone 3 $G_3$ to the gap at zone 2 $G_2$ (i.e., $G_3/G_2$), for a centered inertia mass 150, is 1/2. As a result, the self-centering effect is more substantial for ratios which are greater than 1/2.

The graph of FIG. 27 illustrates a general trend that, up to a point, the pressure differential percentage (and self-centering force) increases as the step size B is reduced, especially for large off-center amounts. However, practical considerations also prevent the size B of the step 205 from becoming too small. For example, extremely small step sizes may be difficult to manufacture, or in the very least, difficult to manufacture for a reasonable cost. Accordingly, the size B of the step 205 (i.e., $G_2$–$G_3$) is desirably greater than, or equal to, 0.0001 inches. Preferably, the size B of the step 205 is greater than or equal to 0.001 inches. Additionally, for the practical concerns described above, the effectiveness of the self-centering inertia mass 150, at least theoretically, declines as the step sizes B become too large. Accordingly, the size B of the step 205 is preferably less than 0.002 inches. However, as mentioned above, the graph of FIG. 27 is based on theoretical calculations using Bernoulli's equation, which assumes perfect fluid flow. For actual fluid flows, a much larger step size B may be desirable. For example, in actual applications, a step size B of 0.02 inches, 0.03 inches, or even up to 0.05 inches is believed to provide a beneficial self-centering effect. The effectiveness of larger step sizes B in actual applications is primarily a result of boundary layers of slow-moving, or non-moving fluid adjacent the inertia mass 150 and shaft 134 surfaces resulting in a lower actual flow rate than theoretically calculated using Bernoulli's equation.

Figure 28:
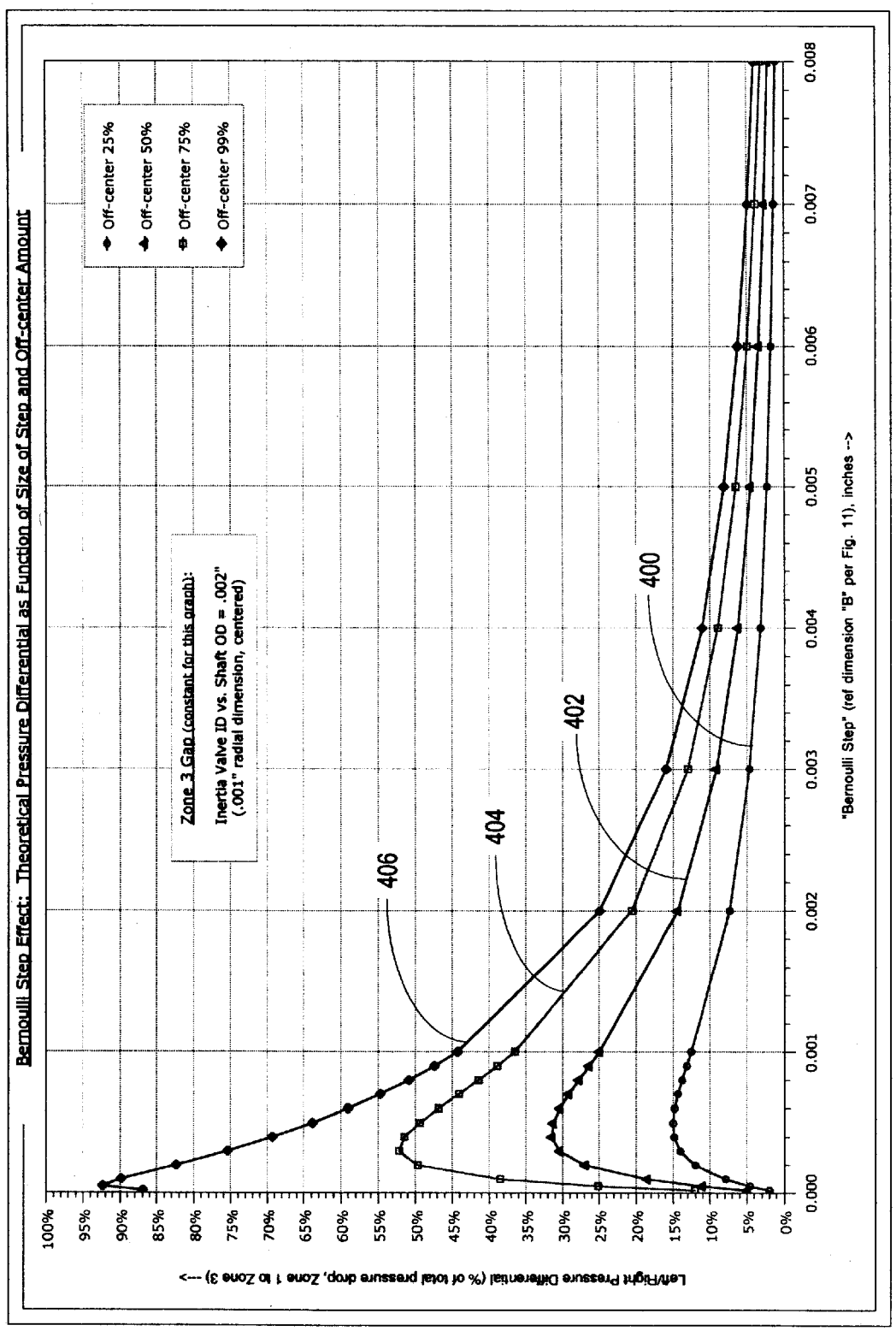
FIG. 28 is a graph of the pressure differential factor of fluid acting on the left and right sides of the inertia mass versus the internal diameter of the inertia mass for a radial gap between the inertia mass and shaft of 0.001 inches.

FIG. 28 is a graph, similar to the graph of FIG. 27, illustrating the relationship between the size B of the step 205 and the resulting pressure differential percentage, except that the gap $G_3$ is 0.001 inches when the inertia valve 150 is centered. That is, the inertia mass diameter D minus the shaft diameter d is equal to 0.002 inches, which results in a gap on each of the right and left sides, $G_{3R}$ and $G_{3L}$, of 0.001 inches.

The graph includes individual lines representing inertia mass 150 off-center values of 25%, 50%, 75% and 99%. Line 400 represents an off-center amount of 25%, line 402 represents an off-center amount of 50%, line 404 represents an off-center amount of 75%, and line 406 represents an off-center amount of 99%.

The largest step size B illustrated on the graph of FIG. 28 is 0.008 inches. The ratio between the gap at zone 3 $G_3$ and the gap at zone 2 $G_2$ (i.e., $G_3/G_2$) in this situation is 1/9, for a centered inertia mass 150 and a gap at zone 3 $G_3$ of 0.001 inches. A step size B of greater than 0.008 inches is possible however, as discussed above, at least for off-road bicycle applications, the step size B is preferably less than 0.008 inches based on theoretical calculations.

For at least a portion of the illustrated off-center amounts, the pressure differential increases at a point when the step size B is equal to 0.003 inches. At this point, the ratio between the gap at zone 3 $G_3$ and the gap at zone 2 $G_2$ (i.e., $G_3/G_2$), for a centered inertia mass 150, is 1/4. As a result, the centering effect is more substantial for ratios which are greater than 1/4. The lines 400–406 illustrate that the pressure differential again increases at a point when the step size B is equal to 0.002 inches. At this point, the ratio between the gap at zone 3 $G_3$ and the gap at zone 2 $G_2$ (i.e., $G_3/G_2$), for a centered inertia mass 150, is 1/3. As a result, the self-centering effect is greater for ratios above 1/3.

The pressure differential again increases for step sizes B less than 0.0015. At this point, the ratio of the gap at zone 3 $G_3$ to the gap at zone 2 $G_2$ (i.e., $G_3/G_2$), for a centered inertia mass 150, is 2/5. Accordingly, the centering effect is more substantial for ratios which are greater than 2/5. Further, the pressure differential increases at a point when the step size B is equal to 0.001 inches. At this point, the ratio of the gap at zone 3 $G_3$ to the gap at zone 2 $G_2$ (i.e., $G_3/G_2$), for a centered inertia mass 150, is 1/2. As a result, the centering effect is more substantial for ratios which are greater than 1/2.

The design parameters of the self-centering inertia mass 150 described above, including the size of the gaps G in the different zones ($Z_1$, $Z_2$, $Z_3$) and the size B of the step 205, for example, as well as other considerations, such as the length of time the inertia mass 150 stays open in response to an activating acceleration force, the spring rate of the biasing spring and the mass of the inertia mass 150, for example, may each be varied to achieve a large number of possible combinations. More than one combination may produce suitable overall performance for a given application. In a common off-road bicycle application, the combination desirably provides a self-centering force of between 0 and 800 lbs. for an off-center amount of 25%. Preferably, a self-centering force of between 0 and 40 lbs. is produced and more preferably, a self-centering force of between 0 and 5 lbs. is produced for an off-center value of 25%. Desirably, the combination provides a self-centering force of at least 0.25 ounces for an off-center amount of 25%. Preferably, a self-centering force of at least 0.5 ounces is produced and more preferably, a self-centering force of at least 1 ounce is produced for an off-center value of 25%. Most preferably a self-centering force of at least 2 ounces is produced for an off-center value of 25%. The above values are desirable for a rear shock absorber 38 for an off-road bicycle 20. The recited values may vary in other applications, such as when adapted for use in the front suspension fork 34 or for use in other vehicles or non-vehicular applications.

Although the present invention has been explained in the context of several preferred embodiments, minor modifications and rearrangements of the illustrated embodiments may be made without departing from the scope of the invention. For example, but without limitation, although the preferred embodiments described an inertia valve dampener for altering the rate of compression damping, the principles taught may also be utilized in dampener embodiments for altering rebound damping, or for responding to lateral acceleration forces, rather than vertical acceleration forces. In addition, although the preferred embodiments were described in the context of an off-road bicycle application, the present dampener may be modified for use in a variety of vehicles, or in non-vehicular applications where dampeners may be utilized. Furthermore, the self-centering and timer features of the inertia valve assembly may be applied to other types of valves, which may be actuated by acceleration forces or by means other than acceleration forces. Accordingly, the scope of the present invention is to be defined only by the appended claims.

What is claimed is:

1. An acceleration-sensitive dampener, comprising:

a first section at least partially defining a first chamber;

a second section comprising a piston, said piston being movable within said first chamber;

a second chamber defined by said dampener;

a first flow circuit connecting said first chamber and said second chamber;

an inertia valve, comprising an inertia mass, said inertia mass being movable between a first position wherein said valve substantially prevents fluid flow through said first flow circuit and a second position which permits fluid flow through said first circuit; said inertia mass moving between said first position and said second position in response to an acceleration force over a threshold, said acceleration force further causing said piston to move within said first chamber, said piston movement continuing until said piston completes a compression stroke, said inertia valve further comprising a body including a portion which cooperates to exert a force on said inertia mass which delays said inertia mass from returning to said first position until a period of time after completion of said compression stroke.

2. The acceleration-sensitive dampener of claim 1, where in response to an acceleration force over said threshold before said inertia mass returns to said first position, said inertia mass returns to said second position and said portion of said body cooperates to delay said inertia mass from returning to said first position.

3. The acceleration-sensitive dampener of claim 1, wherein said body comprises a socket for receiving at least a portion of said inertia mass wherein relative movement of said inertia mass out of said socket is restricted by fluid suction.

4. The acceleration-sensitive dampener of claim 1, wherein said body delays said inertia mass from returning to said first position until after both a last acceleration force over said threshold and between 0.05 seconds and 5.0 seconds after completion of said compression stroke.

5. The acceleration-sensitive dampener of claim 1, wherein said body delays said inertia mass from returning to said first position until after both a last acceleration force over said threshold and between 0.1 seconds and 2.5 seconds after completion of said compression stroke.

6. The acceleration-sensitive dampener of claim 1, wherein said body delays said inertia mass from returning to said first position until after both a last acceleration force over said threshold and between 0.2 seconds and 1.5 seconds after completion of said compression stroke.

7. The acceleration-sensitive dampener of claim 1, further comprising a third section which defines said second chamber.

8. The acceleration-sensitive dampener of claim 7, wherein said second section further defines a rebound chamber.

9. The acceleration-sensitive dampener of claim 1, wherein said second chamber at least partially surrounds said first chamber.

10. An acceleration-sensitive dampener, comprising:
a first section at least partially defining a first chamber;
a second section comprising a piston, said piston being movable within said first chamber;
a second chamber defined by said dampener;
a first flow circuit connecting said first chamber and said second chamber;
an inertia valve, comprising an inertia mass and a stop defining a socket for receiving said inertia mass, said inertia mass being movable between a first position and a second position, wherein in said first position said valve is spaced from said stop, said valve being configured to substantially prevent fluid flow through said first circuit when said mass is in said first position, and wherein in said second position said valve abuts said stop and is at least partially positioned within said socket, said valve being configured to permit fluid flow through said first flow circuit when said mass is in said second position, said inertia mass moving between said first position and said second position in response to an acceleration force over a threshold, said acceleration force further causing said piston to move within said first chamber, said piston movement continuing until said piston completes a compression stroke, said inertia valve further comprising a body including a portion which cooperates to exert a force on said inertia mass which delays said inertia mass from returning to said first position until a period of time after completion of said compression stroke.

11. The acceleration-sensitive dampener of claim 10, where in response to an acceleration force over said threshold before said mass returns to said first position, said inertia mass returns to said second position and said portion of said body cooperates to delay said inertia mass from returning to said first position.

12. The acceleration-sensitive dampener of claim 10, wherein duration of such delay is independent of direction of movement of said piston.

13. The acceleration-sensitive dampener of claim 10, wherein said body delays said inertia mass from returning to said first position until after both a last acceleration force over said threshold and between 0.05 seconds and 5.0 seconds after completion of said compression stroke.

14. The acceleration-sensitive dampener of claim 10, wherein said body delays said inertia mass from returning to said first position until after both a last acceleration force over said threshold and between 0.1 seconds and 2.5 seconds after completion of said compression stroke.

15. The acceleration-sensitive dampener of claim 10, wherein said body delays said inertia mass from returning to said first position until after both a last acceleration force over said threshold and between 0.2 seconds and 1.5 seconds after completion of said compression stroke.

16. The acceleration-sensitive dampener of claim 10, further comprising a third section which defines said second chamber.

17. The acceleration-sensitive dampener of claim 16, wherein said second section further defines a rebound chamber.

18. The acceleration-sensitive dampener of claim 10, wherein said second chamber at least partially surrounds said first chamber.

19. An acceleration-sensitive dampener, comprising:
a first section at least partially defining a first chamber;
a second section comprising a piston, said piston being movable within said first chamber;
a second chamber defined by said dampener;
a first flow circuit connecting said first chamber and said second chamber;
an inertia valve, comprising an inertia mass, said inertia mass being movable between a first position wherein said valve substantially prevents fluid flow through said first flow circuit and a second position which permits fluid flow through said first circuit; said inertia mass moving between said first position and said second position in response to an acceleration force over a threshold, said acceleration force further causing said piston to move within said first chamber, said piston movement continuing until said piston completes a compression stroke, said inertia valve further comprising a body including a portion which cooperates to exert a force on said inertia mass which delays said inertia mass from returning to said first position, wherein duration of such delay is independent of direction of movement of said piston.

20. The acceleration-sensitive dampener of claim 19, where in response to an acceleration force over said threshold before said mass returns to said first position, said inertia mass returns to said second position and said portion of said body cooperates to delay said inertia mass from returning to said first position.

21. The acceleration-sensitive dampener of claim 19, wherein said body delays said inertia mass from returning to said first position until after both a last acceleration force over said threshold and between 0.05 seconds and 5.0 seconds after completion of said compression stroke.

22. The acceleration-sensitive dampener of claim 19, further comprising a third section which defines said second chamber.

23. The acceleration-sensitive dampener of claim 22, wherein said second section further defines a rebound chamber.

24. The acceleration-sensitive dampener of claim 19, wherein said second chamber at least partially surrounds said first chamber.

25. A method of dampening, comprising:
   providing an acceleration-sensitive dampener having a first section at least partially defining a first chamber, a second section comprising a piston, said piston being movable within said first chamber, a second chamber, a first flow circuit connecting said first chamber and said second chamber, an inertia valve, comprising an inertia mass, said inertia mass being movable between a first position wherein said valve substantially prevents fluid flow through said first flow circuit and a second position which permits fluid flow through said first circuit;
   applying an acceleration force to said inertia valve to move said inertia mass from said first position to said second position and to move said piston within said first chamber, said movement of said piston continuing until said piston completes a compression stroke;
   delaying said inertia mass from returning to said first position until after a period of time after completion of said compression stroke.

26. The method of claim 25, further comprising the step of said inertia mass returning to said second position in response to an acceleration force over said threshold before said inertia mass returns to said first position and delaying said inertia mass from returning to said first position until after said period of time.

27. The method of claim 25, wherein said delaying step comprises delaying said inertia mass from moving from said second position and to said first position until after both a last acceleration force over said threshold and between 0.05 seconds and 5.0 seconds after completion of said compression stroke.

28. The method of claim 25, wherein said delaying step comprises delaying said inertia mass from moving from said second position and to said first position until after both a last acceleration force over said threshold and between 0.1 seconds and 2.5 seconds after completion of said compression stroke.

29. The method of claim 25, wherein said delaying step comprises delaying moving said inertia mass from said second position and to said first position until after both a last acceleration force over said threshold and between 0.2 seconds and 1.5 seconds after completion of said compression stroke.

30. An acceleration-sensitive dampener, comprising:
   a first section at least partially defining a first chamber;
   a second section comprising a piston, said piston being movable within said first chamber;
   a second chamber defined by said dampener;
   a first flow circuit connecting said first chamber and said second chamber;
   an inertia valve, comprising an inertia mass, said inertia mass being movable between a first position wherein said valve substantially prevents fluid flow through said first flow circuit and a second position which permits fluid flow through said first circuit; said inertia mass moving between said first position and said second position in response to an acceleration force over a threshold, said acceleration force further causing said piston to move within said first chamber, said piston movement continuing until said piston completes a compression stroke, said inertia valve further comprising a means for delaying said inertia mass from returning to said first position until a period of time after completion of said compression stroke.

31. An acceleration-sensitive dampener, comprising:
   a first section at least partially defining a first chamber;
   a second section comprising a piston, said piston being movable within said first chamber;
   a second chamber defined by said dampener;
   a first flow circuit connecting said first chamber and said second chamber;
   an inertia valve, comprising an inertia mass and a stop defining a socket for receiving said inertia mass, said inertia mass being movable between a first position and a second position, wherein in said first position said valve is spaced from said stop, said valve being configured to substantially prevent fluid flow through said first circuit when said mass is in said first position and wherein in said second position said valve abuts said stop and is at least partially positioned within said socket, said valve being configured to permit fluid flow through said first flow circuit when said mass is in said second position, said inertia mass moving between said first position and said second position in response to an acceleration force over a threshold, said acceleration force further causing said piston to move within said first chamber, said piston movement continuing until said piston completes a compression stroke, further comprising means for delaying said inertia mass from returning to said first position until a period of time after completion of said compression stroke.

* * * * *

UNITED STATES PATENT AND TRADEMARK OFFICE
CERTIFICATE OF CORRECTION

PATENT NO.   : 6,581,948 B2
DATED        : June 24, 2003
INVENTOR(S)  : Robert C. Fox It is certified that error appears in the above-identified patent and that said Letters Patent is hereby corrected as shown below:

Column 23,
Line 57, change "$P_1+(4.05 \times 10^{-5})(V_1)^2 = P_2+(4.05 \times 10^{-5})(V_2^2$" to -- $P_1+(4.05 \times 10^{-5})(V_1)^2 = P_2+(4.05 \times 10^{-5})(V_2)^2 =$ --.

Column 37,
Line 20, change "body delays" to -- portion cooperates to delay --.

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,581,948 B2
DATED : June 24, 2003
INVENTOR(S) : Robert C. Fox

It is certified that error appears in the above-identified patent and that said Letters Patent is hereby corrected as shown below:

Column 23,
Line 43, change "$P_1+(\rho/g)(V_1)^2 = P_2+(\rho/g)(V_2)^2$" to -- $P_1+(\rho/2g)(V_1)^2 = P_2+(\rho/2g)(V_2)^2$ --.

Line 54, change "0.3125" to -- 0.03125 --.

Signed and Sealed this

Thirtieth Day of November, 2004

JON W. DUDAS
*Director of the United States Patent and Trademark Office*